US012097417B2

(12) United States Patent
Anton et al.

(10) Patent No.: US 12,097,417 B2
(45) Date of Patent: *Sep. 24, 2024

(54) INTERACTIVE BASKETBALL SYSTEM

(71) Applicant: Huupe Inc., New York, NY (US)

(72) Inventors: Paul Anton, New York, NY (US); Lyth Saeed, Irvine, CA (US); Dan Hayes, Milwaukee, WI (US); Adam Jaber, Melbourne Beach, FL (US); Matt McConaha, Charlotte, NC (US); Yulii Broide, Kyiv (UA)

(73) Assignee: Huupe Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,850

(22) Filed: Jun. 29, 2023

(65) Prior Publication Data

US 2023/0338807 A1  Oct. 26, 2023

Related U.S. Application Data

(63) Continuation of application No. 17/975,731, filed on Oct. 28, 2022, which is a continuation of application
(Continued)

(51) Int. Cl.
*A63B 69/00* (2006.01)
*A63B 24/00* (2006.01)
*A63B 71/06* (2006.01)

(52) U.S. Cl.
CPC ...... *A63B 69/0071* (2013.01); *A63B 24/0021* (2013.01); *A63B 71/0605* (2013.01);
(Continued)

(58) Field of Classification Search
CPC ............ A63B 69/0071; A63B 24/0021; A63B 71/0605; A63B 71/0622;
(Continued)

(56) References Cited

U.S. PATENT DOCUMENTS 4,397,464 A 8/1983 Krug
4,424,968 A 1/1984 Smith
(Continued)

FOREIGN PATENT DOCUMENTS

CN 104190060 12/2014
CN 104815428 8/2015
(Continued)

OTHER PUBLICATIONS

Extended European Search Report in European Appln. No. 21859038.8, mailed Jan. 15, 2024, 9 pages.
(Continued)

*Primary Examiner* — Jeffrey S Vanderveen
(74) *Attorney, Agent, or Firm* — Fish & Richardson P.C.

(57) ABSTRACT

Methods, systems, and apparatus, including computer programs encoded on computer storage media, for a basketball backboard. The basketball backboard includes a display screen, a plurality of sensors configured to generate sensor data regarding a shot attempt of a user, imaging devices configured to generate image data of the shot attempt, a speaker, and a control unit. The control unit can receive (i) the sensor data from the plurality of sensors and (ii) the image data from the imaging devices. Based on the received sensor data, the control unit can determine whether the shot attempt was successful. Based on the received image data and whether the shot attempt was successful, the control unit can generate analytics that indicate characteristics of the user and the shot attempt and recommendations for improving the shot attempt for subsequent shot attempts. The control unit can provide output data representing the analytics.

18 Claims, 8 Drawing Sheets

Related U.S. Application Data

No. 17/697,438, filed on Mar. 17, 2022, now Pat. No. 11,484,760, which is a continuation of application No. PCT/US2021/046468, filed on Aug. 18, 2021.

(60) Provisional application No. 63/067,422, filed on Aug. 19, 2020.

(52) U.S. Cl.
CPC .. *A63B 71/0622* (2013.01); *A63B 2024/0025* (2013.01); *A63B 2071/0625* (2013.01); *A63B 2220/05* (2013.01); *A63B 2220/17* (2013.01); *A63B 2220/40* (2013.01); *A63B 2220/803* (2013.01); *A63B 2220/805* (2013.01); *A63B 2220/806* (2013.01); *A63B 2220/89* (2013.01); *A63B 2225/20* (2013.01)

(58) Field of Classification Search
CPC .... A63B 2024/0025; A63B 2071/0625; A63B 2220/05; A63B 2220/17; A63B 2220/40; A63B 2220/803; A63B 2220/805; A63B 2220/806; A63B 2220/89; A63B 2225/20; A63B 24/0084; A63B 2024/0028; A63B 2024/0037; A63B 2220/16; A63B 2220/62; A63B 24/0062; A63B 63/083; G06N 3/084; G06N 3/045; G01S 17/88

See application file for complete search history.

(56) References Cited

U.S. PATENT DOCUMENTS

| | | |
|---|---|---|
| 6,984,129 B1 | 1/2006 | Jordan |
| 7,094,164 B2 | 8/2006 | Marty et al. |
| 8,579,632 B2 | 11/2013 | Crowley |
| 8,597,095 B2 | 12/2013 | Crowley et al. |
| 9,186,568 B2 | 11/2015 | Ianni et al. |
| 9,275,470 B1 | 3/2016 | Forkosh et al. |
| 9,345,929 B2 | 5/2016 | Marty et al. |
| 10,360,685 B2 | 7/2019 | Marty et al. |
| 11,045,705 B2 | 6/2021 | Zhang |
| 11,484,760 B2 | 11/2022 | Anton et al. |
| 2002/0165049 A1 | 11/2002 | Dadbeh |
| 2009/0263023 A1 | 10/2009 | Iwamoto |
| 2013/0095961 A1* | 4/2013 | Marty ............... A63B 24/0084 473/450 |
| 2014/0156042 A1 | 6/2014 | Marty et al. |
| 2014/0222177 A1 | 8/2014 | Thurman et al. |
| 2015/0265897 A1 | 9/2015 | Gordon et al. |
| 2016/0121193 A1 | 5/2016 | Marty et al. |
| 2016/0193518 A1 | 7/2016 | Baxter et al. |
| 2016/0279498 A1 | 9/2016 | Gordon et al. |
| 2017/0021228 A1 | 1/2017 | Crowley |
| 2018/0099201 A1 | 4/2018 | Marty et al. |
| 2019/0366153 A1 | 12/2019 | Zhang et al. |
| 2019/0392729 A1 | 12/2019 | Lee et al. |
| 2020/0009443 A1 | 1/2020 | Moravchik et al. |
| 2020/0258419 A1 | 8/2020 | Lee et al. |
| 2021/0019897 A1 | 1/2021 | Biswas et al. |
| 2021/0056337 A1 | 2/2021 | Ono et al. |
| 2021/0174700 A1* | 6/2021 | Zhang ................. G06F 18/214 |
| 2022/0171957 A1 | 6/2022 | Sahai et al. |
| 2022/0212077 A1 | 7/2022 | Anton et al. |
| 2023/0173367 A1 | 6/2023 | Marty et al. |
| 2023/0181987 A1 | 6/2023 | Anton et al. |
| 2023/0338806 A1 | 10/2023 | Anton et al. |

FOREIGN PATENT DOCUMENTS

| | | | |
|---|---|---|---|
| CN | 107812368 A | 3/2018 | |
| CN | 108905126 A | * 11/2018 | ........... A63B 63/083 |
| CN | 109862949 | 6/2019 | |
| CN | 110935158 | 3/2020 | |
| WO | WO 2018/039341 A1 | 3/2018 | |
| WO | WO 2018/158773 | 9/2018 | |

OTHER PUBLICATIONS

International Search Report and Written Opinion for corresponding Appl No. PCT/US2021/046468, dated Nov. 30, 2021.

* cited by examiner

INTERACTIVE BASKETBALL SYSTEM

CROSS-REFERENCE TO RELATED APPLICATIONS

The present application is a continuation of, and claims benefit under 35 USC 120 to, U.S. application Ser. No. 17/975,731, filed Oct. 28, 2022, which is a continuation of, and claims benefit under 35 USC 120 to, U.S. application Ser. No. 17/697,438, filed Mar. 17, 2022, now U.S. Pat. No. 11,484,760, which is a continuation of, and claims benefit under 35 USC 120 to, international application PCT/US2021/046468, filed Aug. 18, 2021, which claims benefit under 35 USC 119(e) to U.S. Application No. 63/067,422, filed Aug. 19, 2020. The entire disclosure of these applications are incorporated by reference herein.

TECHNICAL FIELD

The specification generally relates to the sport of basketball, and one particular implementation relates to systems and methods for basketball games and various trainings.

BACKGROUND

The game of basketball is a sport that can include two teams, opposing one another on a basketball court. The two teams can compete against one another with an objective of shooting a basketball through a defender's basketball hoop while preventing the opposing team from shooting through their own basketball hoop. Players with varying skill level can play basketball, and often, practice basketball skills to improve their chances of success during a game of basketball against opponents. Moreover, players may hire coaches, trainers, or others to assist with training their basketball skillset over time.

SUMMARY

This specification describes a basketball system that includes specific components for monitoring a user playing basketball. In particular, the basketball system can include a backboard, a rim, and a pole that supports the backboard. The backboard can include multiple layers, each layer housing different components. The components can be positioned in particular manners and varying layouts in the backboard to enable the components to monitor one or more characteristics of one or more users interacting with the basketball system on a court within proximity to the basketball system.

In some implementations, the basketball system can be placed at a basketball court. The basketball court can include, for example, a driveway, a street, a court inside a gymnasium that can include professional, collegiate level, or younger dimensions, and other various locations. The court can include, for example, two halves, each with a free throw line, a three-point line, a half-court line, and other characteristics. The basketball system can monitor characteristics of users that play basketball up to the half-court line or to a full length of the court. In other examples, the basketball system can monitor characteristics of users that play basketball when playing in their driveway, street, or other locations.

The basketball system can monitor characteristics of one user playing basketball or multiple users playing basketball. In particular, a user can interact with the basketball system to indicate that he/she requests to be tracked by the basketball system. The user can play basketball with the basketball system and the basketball system can generate characteristics that describe the user's play. For example, the characteristics can include a number of shots attempted by the user, a number of shots made by the user from the attempts, movements of the user, body posture during shot attempts, characteristics of each shot attempt by the user, and other characteristics. The basketball system can provide these characteristics to a client device of the user for later viewing or display these characteristics on the basketball system in real time while the user interacts with the basketball system.

In some implementations, the backboard of the basketball system can include the components for tracking one or more users playing basketball with the basketball system and the ability to provide feedback to the users. For example, the backboard of the basketball system can include multiple layers each housing different components. A front layer of the backboard can include a transparent coating for protection of the components within the backboard. A second layer of the backboard can include one or more components for monitoring the users interacting with the basketball system. In some implementations, the second layer can also include a display for providing feedback to the user playing basketball along with the sensors. In other implementations, the display can be positioned in a third layer and the components can be provided in the second layer. In some examples, the layers of the backboard can be ordered from front to back as: first layer, second layer, and/or third layer.

In some implementations, the components in the backboard can be configured to monitor the users playing basketball and provide feedback. For example, the components can include a camera sensing system, one or more speakers, one or more microphones, multiple sensors, a control unit, a display screen, and a power unit. The control unit can receive the data from each of these components, generate characteristics of the user(s), and provide feedback to the user(s) to help improve their basketball skillset or performance. In some examples, the control unit can train a machine-learning model for tracking and generating the characteristics of the user(s) playing basketball. The machine-learning model can be, for example, a convolutional neural network (CNN). These components and their functions will be further described in detail below.

In some implementations, the basketball system can offer various games for the user(s) to play. For example, the basketball system enables the user to play against another user or other users at a geographically different location. In this example, the other user can play basketball with their own basketball system, and the two basketball systems can communicate with one another in real time as the two users play with their respective basketball systems. For example, both backboards can display shot statistics, a real-time video feed of the other user's basketball gameplay, and other information that each user can view while interacting with the basketball system. In another example, the basketball system can enable users to play games such as, training sessions modes, local head-to-head matchups, live stream mode, and worldwide competition mode. These gameplays will be further described below.

In one general aspect, a basketball board comprising: a display screen; a plurality of sensors configured to generate sensor data regarding a shot attempt of a user; one or more imaging devices configured to generate image data of the shot attempt; a speaker; and a control unit, wherein the control unit is configured to: receive (i) the sensor data from one or more of the plurality of sensors and (ii) the image data from the one or more imaging devices; based on the received sensor data, determine whether the shot attempt was successful; based on the received image data and whether the shot attempt was successful, generate analytics that indicate (i) characteristics of the user, (ii) characteristics of the shot attempt, and (iii) recommendations for improving the shot attempt for subsequent shot attempts, (iv) game performance; and provide output data representing the analytics to one or more of (i) the speaker, (ii) the display screen, and (iii) a client device of the user.

Other embodiments of these and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by a data processing apparatus, cause the apparatus to perform the actions.

The foregoing and other embodiments can each optionally include one or more of the following features, alone or in combination. For example, one embodiment includes all the following features in combination.

In some implementations, the backboard includes wherein the plurality of sensors comprise one or more of LIDAR sensors, motion sensors, trip sensors, and accelerometers, and wherein the LIDAR sensors are configured to detect the shot attempt of the user and one or both of an angle and a height of the basketball from the shot attempt; the motion sensors are configured to detect one or more users on a court within a proximity to the backboard; the trip sensors are configured to determine whether the shot attempt was successful; and the accelerometers are configured to determine an indication of a location of the basketball relative to the backboard based on accelerometer data and a vibration pattern.

In some implementations, the backboard includes wherein the one or more imaging devices comprise one or more depth sensing cameras or one or more RGB cameras, wherein the one or more depth sensing cameras are configured to perform one or more of the following (i) detect the user on a court, (ii) track movements of the user, (iii) detect the basketball used by the user for the shot attempt, (iv) track movements of the basketball, (v) detect a body posture of a user, and wherein the one or more RGB cameras are configured to (i) record image data of a field of view of the court and (ii) record image data of an area underneath the backboard to detect when the shot attempt of the user corresponds to a layup.

In some implementations, the backboard includes a rim coupled to the backboard.

In some implementations, the backboard includes wherein the plurality of sensors comprise trip sensors configured to determine whether the basketball passes through the rim from the shot attempt.

In some implementations, the backboard includes wherein the speaker is configured to provide audible output in response to receiving the output data representing the analytics from the control unit.

In some implementations, the backboard includes wherein the display screen is configured to display one or more of (i) the image data from the one or more imaging devices, (ii) a heads up display (HUD) displaying shot attempts and shots made by the user or any other data pertinent to the user and/or the game/training session, and (iii) image data from a second control unit connected over a network.

In some implementations, the backboard further includes a protective layer coupled to the display screen.

In some implementations, the backboard includes wherein the protective layer comprises tempered glass.

In some implementations, the backboard includes a rim coupled to the protective layer.

In some implementations, the backboard includes wherein the control unit is configured to provide the received image data to a trained machine learning model to produce (i) the characteristics of the user and (ii) the characteristics of the shot attempt, and (iii) game performance, wherein the characteristics of the user comprise an identification of the user and a location of the user relative to the backboard, wherein the characteristics of the shot attempt comprise an angle of basketball trajectory and an indication of whether the basketball passes through the rim, wherein the game performance comprises data associated with a game played by the user; and the control unit is configured to store the characteristics of the user and the characteristics of the shot attempt in a profile of the user in a server external to the backboard.

In some implementations, the backboard includes wherein the trained machine-learning model is configured to identify and track multiple users on a court simultaneously and the control unit is configured to: associate the multiple users identified by the trained machine-learning model each with a stored user profile; and update each of the stored user profiles with the characteristics of each user and the characteristics of the shot attempt for each user.

In some implementations, the backboard includes wherein the server stores a plurality of profiles corresponding to different users.

In some implementations, the backboard includes wherein the control unit is configured to: generate the recommendations for improving the shot attempt for subsequent shot attempts, wherein the recommendations comprise one or more of (i) a body posture, (ii) an arm angle, (iii) a release point of the basketball, and (iv) a trajectory of the basketball; display the generated recommendations on the display screen; and provide an audible voice output to the speaker to communicate the generated recommendations to the user.

In some implementations, the backboard includes wherein the control unit is configured to provide the generated recommendations to the client device of the user over a network.

In some implementations, the backboard includes wherein the control unit is configured to: determine resultant data based on the received sensor data that comprises one or more of (i) whether the shot attempt resulted in the basketball passing through the rim, (ii) whether the shot attempt resulted in the basketball bouncing off a front side of the backboard and not passing through the rim, (iii) whether the shot attempt resulted in the basketball bouncing off the rim and not passing through the rim, (iv) location of the shot attempt of the user, (v) an arc of the basketball during the shot attempt by the user; combine the resultant data with (i) the characteristics of the user and (ii) the characteristics of the shot attempt output from the trained machine learning model; and store the received sensor data, the received image data, the combined resultant data, the characteristics of the user, the characteristics of the shot attempt, and the generated recommendations in the profile of the user on the server.

In some implementations, the backboard includes wherein the control unit is configured to: receive an indication from the user to participate in a competition against a second user; connect to a second control unit associated with a second backboard used by the second user over a network, wherein the second control unit is located at a geographically different location than the control unit; provide the received image data to the second control unit over the network; receive second image data from the second control unit over the network; provide the received second image data from the second control unit to the display screen; count a number of shot attempts made by the user based on the received sensor data and the received image data; receive a second number of shot attempts made by the second user from the second control unit; provide to the display screen (i) the number of shot attempts made by the user and (ii) the second number of shot attempts made by the second user, wherein the display screen overlays the number of shot attempts and the second number of shot attempts over the received second image data; and provide the number of shot attempts made by the user to the second control unit.

In some implementations, the backboard includes wherein the control unit is configured to: receive an indication from the user to participate in a competition against a second user in a local competition; provide the received image data to the display screen; count a number of shot attempts made by the user based on the received sensor data and the received image data; count a number of shot attempts made by the second user based on the received sensor data and the received image data; and provide to the display screen (i) the number of shot attempts made by the user and (ii) the number of shot attempts made by the second user, wherein the display screen overlays the number of shot attempts and the second number of shot attempts over the received image data.

In some implementations, the backboard includes wherein the control unit is configured to: determine whether the shot attempt resulted in the basketball passing through the rim based on: generating, in the received image data, an inner conical region and an outer conical region, the inner conical region comprises a first cone with a base that coincides with the rim and a first height, the outer conical region comprises a second cone with a radius centered at the center of the rim and a second height, determining whether the basketball enters a first portion of the outer conical region and exits a second portion of the outer conical region; in response to exiting the second portion of the outer conical region, determining whether the basketball enters a third portion of the inner conical region and exits the base of the inner conical region; and in response to determining that the basketball exits the base of the inner conical region, determining that the shot attempt resulted in a make as the basketball passed through the rim.

In some implementations, the backboard includes wherein the control unit is configured to: in response to determining that the basketball enters the third portion of the inner conical region and does not exit the base of the inner conical region, determine that the shot attempt resulted in a miss as the basketball did not passing through the rim.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
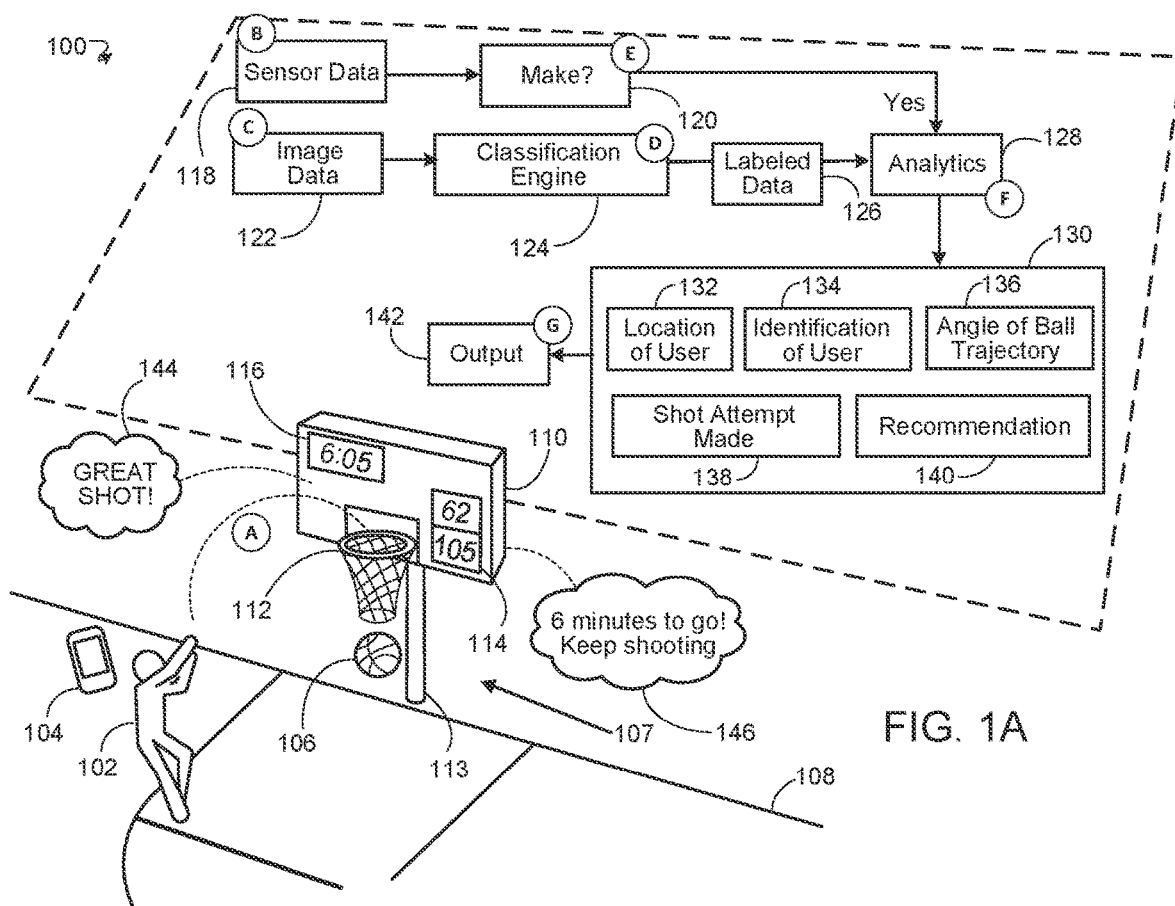
FIG. 1A is a block diagram that illustrates an example of a system for monitoring a user playing basketball.

FIG. 1A is a block diagram that illustrates an example of a system 100 for monitoring a user or users interacting with the system 100 through an activity, such as a user or users playing basketball. The system 100 includes a basketball system 107, a basketball court 108, one or more users 102, and a client device 104 associated with the one or more users 102. The system 100 can also include a network and server external to the basketball system 107. Briefly, the system 100 can monitor the one or more users 102 playing with a basketball 106 and the basketball system 107, generate data that describes the characteristics of the one or more users 102 playing with the basketball 106, and provide data as feedback to the one or more users 102. The system 100 can provide the data as feedback to the client device 104 or to a display of the basketball system 107. FIG. 1A illustrates various operations in exemplary stages (A) through (G) which can be performed in the sequence indicated or another sequence.

In some implementations, the basketball system 107 can include a backboard 110, a pole 113, and a rim 112. The basketball system 107 can include various components and algorithms that enable tracking and monitoring of the one or more users 102 playing the game of basketball. Additionally, the various components of the basketball system 107 can generate recommendations to improve a basketball skillset of the user 102. The recommendations can focus on improving, for example, a trajectory of a basketball shot for a user, a user's body posture during a basketball shot, dribbling techniques of the user, and other basketball techniques. As will be further described below, the basketball system 107 can track multiple users 102, track the users' basketball characteristics, and store this data in a user profile located in a server external to the basketball system 107.

Moreover, the basketball system 107 enables the one or more users 102 to play basketball games with each other at the same basketball system and with other users located remote from their own respective basketball systems, including other basketball systems located at locations around the world. In some implementations, the user 102 can request to play basketball games or other activities, such as basketball training sessions, by interacting with the basketball system 107. In other implementations, the user 102 can request to play basketball games with the basketball system 107 by interacting with the client device 104 that communicates with the basketball system 107 over a network, such as one or more of Bluetooth, Wi-Fi, Internet, cloud access, and a cellular data network, e.g., a network with 4G and 5G capabilities. As will be further described below, the basketball games or other activities can include, for example, a training session mode, a head-to-head matchup mode, a worldwide competition mode, and a live stream mode, to name a few.

In some implementations, the basketball system 107 can include a rim 112 and a backboard 110 that is vertically supported above a basketball court 108 or another playing surface, such as a driveway, street, lawn, or other applicable surface. The basketball system 107 includes a pole 113 or support on which the backboard 110 and the rim 112 are supported. In some examples, the pole 113 can be inserted or embedded a particular depth into the ground to maintain stability of the basketball system 107. In other examples, the pole 113 can be inserted into a base platform above the ground that maintains stability of the basketball system 107. In some cases, the basketball system 107 can be a small sized basketball system that fits over a doorframe in an office or bedroom, for example.

In some implementations, the backboard 110 can include multiple layers, each layer housing different components. In particular, a front layer of the backboard 110 can include a transparent coating for protection of the components within the backboard. For example, a front layer of the backboard 110 can include tempered glass that (i) protects the components within the backboard 110 and (ii) allows a user to see a display screen behind the front layer. The backboard 110 can include a second layer, which is seated or positioned behind the front layer. The second layer can include one or more components, e.g., sensors and cameras, for monitoring and generating data, e.g., sensor data and image data, associated with user(s) on the court. In some implementations, the second layer of the backboard can also include a display for providing feedback to the one or more users playing basketball on the basketball court 108. In this case, the sensors and cameras can be coupled to the display screen. In other implementations, the backboard can include a third layer that is positioned behind the second layer. In this implementation, the third layer can include the display that provides feedback to the one or more users playing basketball on the basketball court 108.

In some implementations, the basketball system 107 can include a control unit. The control unit can include one or more central processing units (CPUs), one or more graphical processing units (GPUs), and memory components for executing software by the CPUs and GPUs. In some examples, the control unit can be positioned on a rear side of the backboard 110. In other examples, the control unit can be positioned within either the second layer or the third layer of the backboard 110.

Generally, the control unit can receive the sensor and image data from the one or more components within the backboard. Based on the received sensor and image data, the control unit can generate data regarding basketball characteristics of the user or users 102 playing basketball with the basketball system 107 on the basketball court 108. The control unit can identify a user profile associated with the user 102, for example, and store the generated basketball characteristics of the user in the profile for that user. The control unit can store the user profile and associated data within the backboard 110. Alternatively, the control unit can access a server external to the backboard 110 over a network and store the generated basketball characteristics within an identified user profile in the server. The network can include, for example, one or more of Bluetooth, Wi-Fi, Internet, cloud access, and a cellular data network, e.g., 4G and 5G capabilities.

In some implementations, the control unit can generate recommendations for a particular user based on the data regarding basketball characteristics of the user. The control unit can display the generated recommendations to the display screen of the backboard. Additionally, the control unit can provide the generated recommendations to the client device 104 of the user 102. The control unit can also store the generated recommendations with the generated profile of an identified user, e.g., with the profile of user 102.

In some implementations, the basketball system 107 can include a power source that powers the one or more components coupled to the backboard 110. For example, the power source can power the one or more components within the second layer of the backboard 110, the display within the backboard 110, and the control unit. The power source can include, for example, a power plug that is inserted into an outlet, a solar energy panel coupled to the basketball system 107, or a rechargeable battery pack attached or coupled to the basketball system 107.

In some implementations, the backboard 110 can include one or more components that monitor the user(s) 102 playing with the basketball 106 on the basketball court 108. In particular, the one or more components can include multiple sensors and multiple cameras positioned within the backboard 110. The multiple sensors can include, for example, one or more vibration sensors, one or more trip sensors, one or more accelerometers, light detection and ranging (LIDAR) sensors, one or more motion sensors, and one or more pressure sensors. The multiple cameras can include depth sensing cameras, such as real sense depth cameras, and red green blue (RGB) cameras. The control data can receive the data from each of the multiple sensors and from each of the multiple cameras to generate characteristics about the user 102 playing basketball.

Each of the sensors included within the backboard 110 can be configured for a different purpose. For example, the vibration sensors can be configured to detect a vibration of the basketball system 107 from the basketball 106 (i) bouncing off the rim 112, (ii) bouncing off the backboard 110, (iii) passing through the rim 112, and (iv) a user 102 dribbling the basketball on the basketball court 108. The trip sensors can be configured to determine whether user 102's shot attempt was successful. A successful shot attempt can indicate that the basketball 106 passed through the rim 112. An unsuccessful shot attempt can indicate that the basketball 106 did not pass through the rim 112. This will be further illustrated and described below.

The accelerometers can be configured to determine a location of the basketball relative to the backboard based on accelerometer data and a vibration pattern. For example, when user 102 shoots the basketball 106 towards the basketball system in an unsuccessful shot, the basketball 106 may bounce off the rim 112 at a particular location. The location can be, for example, the front of the rim 112, the back of the rim 112, or a side of the rim 112. Additionally, the location can be, for example, a particular location on a front side of the backboard. Based on where the basketball 106 bounces off the backboard 110, the basketball system 107 can exhibit a specific vibration pattern. The specific vibration pattern can correspond to a speed or frequency at which a component of the basketball system 107, e.g., backboard 110, rim 112, pole 113, or a combination of the above, vibrates. The accelerometers can be configured to measure the speed or frequency of the vibration pattern and provide the detected vibration pattern to the control unit.

In some examples, the accelerometer can determine the location that the basketball 106 bounced off the basketball system 107 based on the determined vibration pattern. The accelerometer can compare the determined vibration pattern to one or more stored vibration patterns. Each stored vibration pattern can indicate a location of where the basketball 106 hit on the basketball system 107. In this case, the accelerometer can provide the vibration pattern and the location of where the basketball 106 bounced off the basketball system 107, in either a successful or an unsuccessful shot attempt, to the control unit. In other examples, the control unit can use the accelerometer data in conjunction with a signal-processing algorithm to determine the specific vibration pattern inherent in the different strike locations of the rim. For example, the control unit can sample the accelerometer data, run the sampled data through one or more matched filters to seek to identify the vibration pattern, and identify the vibration pattern that most closely matches to the matched filter. In other examples, the control unit can apply other signal-processing algorithms such as low-pass filters, high-pass filters, acoustic modeling, waveform matching, Fast Fourier transforms, Acceleration signal matching, and matching between signals based on statistical properties.

In some implementations, the LIDAR sensors can be configured to detect a shot attempt of user 102 and to detect characteristics of the shot attempt of the basketball 106 from the user 102. For example, the LIDAR sensors can indicate that a detection of the shot attempt based on a user 102's release of basketball 106 and the body posture of user 102 during the shot attempt. LIDAR sensors can produce thousands of points per second at a resolution of millimeters for an object within its range, when the range may be 15 meters, for example. The LIDAR sensors can detect when the basketball 106 separates from the user 102 during a shot attempt. Additionally, the LIDAR sensors can detect the characteristics of the shot attempt of the basketball 106 that can include an angle and height of the basketball 106 during the shot attempt. The LIDAR sensors can indicate an angle of the basketball 106 relative to the rim 112 during time increments of the shot attempt of the basketball 106's trajectory. Additionally, the LIDAR sensor can indicate a height of the basketball 106 relative to the basketball court 108 during time increments of the shot attempt of the basketball 106's trajectory. For example, the LIDAR sensor can indicate that the angle of the basketball 106 is 45 degrees at time t0, 30 degrees at time t1, 22.5 degrees at t2, until the basketball reaches the rim 112 at −35 degrees at time tN. The LIDAR sensors can provide this data to the control unit as the user 102 plays basketball. In some examples, the LIDAR sensor can measure and provide the angle of the basketball shot by measuring an angle between the basketball court and the tangent of the initial arc of the basketball shot at t0. Generally, the angle of the shot that has a chance of becoming a make is between 35 to 60 degrees, of which the LIDAR sensors can measure.

In some implementations, the motion sensors can be configured to detect one or more users 102 on the basketball court 108 within a proximity to the backboard 110. For example, the motion sensors can detect movement on the basketball court 108 and can detect movement of a basketball 106. Based on the detection of movement, in some examples, the motion sensors can indicate whether the movement corresponds to a user 102 movement or to a basketball 106 movement. In other examples, the motion sensors can provide detection of the motion data to the control unit. As will be further described below, the control unit can collate the motion data, other sensor data, and the image data to determine whether the movement corresponds to a user 102 or a basketball 106.

In some implementations, the pressure sensors can be configured to detect and calculate a positon of where the basketball 106 hit the backboard 110. Based on a location where the basketball 106 hit the backboard 110, the control unit can calculate the ball trajectory from the user 102's shot attempt. The location where the basketball 106 hit the backboard 110 can be provided in locational coordinates, e.g., Cartesian or polar coordinates, relative to a front side of the backboard 110. In other examples, the control unit can determine the location where the basketball 106 hit the backboard 110 based on image data and sensor data from other sensors without using the pressure sensor. For example, the control unit can predict the location where on the backboard 110 the basketball 106 will hit based on initial conditions of where the basketball 106 was released by the user 102, known constants of gravity, and air drag, and parabolic mathematical equations. Data provided from the LIDAR sensors can be helpful in making this location determination.

As mentioned above, the multiple cameras can include depth sensing cameras and RGB cameras. The multiple cameras or imaging devices can each be configured to perform different functions. For example, the backboard 110 can include one to three depth-sensing cameras. Other examples are also possible. For example, the backboard 110 can include more than three depth-sensing cameras, such as eight depth-sensing cameras, or more. The depth sensing cameras can be configured to (i) detect the user 102 on the basketball court 108, (ii) track movements of the user 102, (iii) detect the basketball 106 used by the user 102 for the shot attempt, (iv) track movements of the basketball 106, and (v) detect a body posture of user 102. For example, the three depth sensing cameras can have overlapping fields of view (FOV) to include the widest view of the basketball court 108.

For example, the depth sensing cameras located in the backboard 110 can be configured to detect the user 102 on the basketball court 108 based on software that detects movement of user 102 and identification of the user 102. The depth sensing cameras can detect and identify the user 102 without using machine-learning models, e.g., convolutional neural networks (CNNs), which provides advantages over prior systems. Moreover, the depth sensing cameras can track a movement of the user 102 as the user moves along the basketball court 108. The user can move, for example, to a location behind the free throw line to take attempt a shot, to a location behind the three-point line to attempt a shot, or to any other location on the basketball court 108.

The depth sensing cameras can track the user 102 by generating locational coordinates of the user 102 along the basketball court 108, and providing the locational coordinates of the user 102 within the image data to the control unit. Similarly, the depth sensing cameras can track the basketball 106 or basketballs by generating locational coordinates of the basketball 106 along the basketball court 108, and providing the locational coordinates of the basketball 106 within the image data to the control unit. For example, within each frame of image data recorded by the depth sensing cameras, the depth sensing cameras can draw a box around the identified user 102 and the basketball 106 and attach locational coordinates to each box, respectively. In this manner, the control unit can determine from each frame of the image data the location of user 102 and the basketball 106 as they move. Moreover, the depth sensing cameras can track multiple basketballs and multiple users on the basketball court 108. The depth sensing cameras can also track and associate shot attempts and shot makes/misses for each user of the multiple users.

The depth sensing cameras can also track a body posture of user 102. The body posture of user 102 can correspond to a posture of the user during dribbling, during a shot attempt, after a shot attempt, e.g., known as a follow through, and moving to rebound the basketball 106 should the user 102's shot attempt be unsuccessful, to name a few examples. The body posture detected by the depth sensing cameras can indicate a position of the body, in locational coordinates. The depth sensing cameras can provide the body posture detection to the control unit, where further analytics can be performed on the body posture detection data.

In some implementations, the backboard 110 can utilize the LIDAR sensors instead of the depth sensing cameras. In addition to the functionality described above with respect to the LIDAR sensors, the LIDAR sensors can also be configured to perform the functionality described by the depth sensing cameras. This functionality can include detecting identification and movement of a user or users on the basketball court. Moreover, the LIDAR sensors can be configured to track movement of identified users over time. The LIDAR sensors can be configured to identify and monitor movement of users without the use of machine-learning models. Similarly, the LIDAR sensors can identify and track movement of one or more basketballs on the basketball court 108, similar tracking movement of one or more basketball by the depth-sensing cameras.

In some implementations, the backboard can include one or more RGB cameras that are configured to perform specific functions. In particular, the specific functions can include (i) recording image data of a field of view of the basketball court 108 and (ii) recording image data of an area underneath the backboard to detect when the shot attempt of the user 102 corresponds to a particular type of shot. For example, the backboard 110 can include one or two RGB cameras. The RGB camera(s) can record, in real time, an area of the basketball court 108 within proximity to the backboard 110. The area can include, for example, an area up to a half court line on the basketball court 108, a length of the full court if the court corresponds to a regulation basketball court, a driveway area, or some other area. Additionally, the RGB camera can record image data of an area below the rim 112, which may be used when user 102 shoots a layup or another type of shot underneath the rim 112 or near the rim 112. The RGB camera can provide the recorded image data to the control unit for further analytics and usages, which will be further described below.

Referring to FIG. 1A, during stage (A), user 102 can request to interact with basketball system 107 by, for example, requesting to play a basketball game. In some implementations, user 102 can access a basketball application on their client device 104. The user 102 can log in to the basketball application using authentication credentials, e.g., username and password, and can gain access to the applications offered by the basketball system 107, such as games, training sessions, and the like. The user 102 can select to interact with the basketball system 107 using the basketball 106. For example, as illustrated in system 100, the user 102 can select a game to count the number of shots made in a predetermined amount of time.

In other implementations, the user 102 can communicate with the basketball system 107 to request to play a basketball game with the basketball system 107. The user 102 can provide a verbal command, e.g., "Hey Huupe," to the basketball system 107 or perform a hand wave to wake up the basketball system 107. The components within the backboard 110, e.g., the microphone and/or the depth sensing cameras, can detect the user communicating with the basketball system 107 and perform functions to detect the user. For example, the microphone and the depth sensing cameras can provide the verbal command, e.g., "Hey Huupe," and the image data detecting the user 102, respectively, to the control unit. The control unit can determine from the audio data and the image data (i) an identification of the user 102 and (ii) an indication that the control unit is to provide the user 102 with access to a list of games to play.

The control unit can provide the list of games to play to the display screen of the backboard 110 or to the user's device 104. Additionally, or alternatively, the control unit can provide the list of games to play in an auditory manner to the speakers of the backboard 110. The user 102 can select which game to play by speaking to the basketball system 107 or making a selection via the user's client device 104. For example, the user 102 can indicate "Hey Huupe, play shot timer" and the control unit can recognize the voice command and determine the user 102 requests to play the shot timer game. Alternatively, the user 102 can select which game to play by waving their hand in front of the basketball system 107. The display of the backboard 110 can list the games to play and the user 102 can stick their arm up to act as a mouse on the display. The depth sensing cameras can recognize through recorded image data that the user 102 reached their arm up and provide the recorded image data to the control unit. The control unit can associate the arm up during this request that the user 102 wishes to select a game to play from the list of games. In a continuous fashion, the user 102 can move their arm, and the depth sensing camera, the control unit, and the display, can work together to exhibit a mouse moving in a fashion similar to the user 102's arm to enable selecting a game to play. The display can visually illustrate a movement of the mouse over the list of games to play that moves as the user 102's arm moves. In another example, each hand position of the user 102 can represent one area of the display screen. In this case, should a user 102 raise a hand straight upwards, the depth cameras, control unit, and display would associate this movement with highlighting a button on the center top of the display screen. Should the user 102 raise a right hand at a 45 degree angle, e.g., top right of the display screen, the depth cameras, control unit, and display screen would associate this movement with highlighting a button on the top right corner of the display screen. This process would be similar if the user places a right hand at a −45-degree angle from with their right hand, which would correspond to highlighting a button on the bottom right of the display screen. If the user raises their left hand at a 45-degree angle, this would correspond to highlighting a button on the top left of the display screen. If the user places their left hand at a −45 degree angle, this would correspond to highlighting a button on the bottom left of the display screen. This process is similar for other hand positions around the display. Additionally, when the user changes from an open hand to a closed hand, e.g., open palm to a fist, the control unit can recognize the user desires to select or enter that selection. The selection can also be performed by way of a highlight of a predetermined amount of time, e.g., 3 seconds.

The user 102 can select a game to play based on the arm movements by performing a selection. The selection can be, for example, a finger point, a verbal command, or some other hand gesture that indicates the user selects a particular game. In the example of system 100, the user 102 can select the shot timer game, and in response, the control unit can initiate execution of the shot timer game. For example, the control unit can provide to the display of the backboard a shot timer 116 and a shot counter 114, in digital format. The control unit can indicate to the user 102 to start shooting the basketball 106 through the rim 112 as soon as the shot timer 116 begins to count down.

In some implementations, the control unit can adjust the shot counter 114 as the user 102 attempts shots. For example, the user 102 can perform a shot attempt corresponding to shooting a basketball 106 through rim 112. The depth sensing cameras and the sensors can generate image data and sensor data, respectively, and provide the image data and the sensor data to the control unit, where the control unit can determine (i) whether the user attempted a shot and (ii) whether the shot attempt was successful or unsuccessful. Then, the control unit can update the shot counter 114 in a heads up display (HUD) on the display based on whether the user attempted the shot and whether the shot attempt was successful or unsuccessful. For example, if the user 102 misses the first five shots, the control unit can display "0/5" for the shot counter on the HUD of the backboard.

Additionally, the control unit can display recorded footage from the RGB cameras include within the backboard. For example, as user 102 shoots the basketball 106, the RGB cameras can record an area of the basketball court 108 and provide the recorded image data to the control unit. The control unit can receive the recorded image data and display the recorded image data in real time on the display of the backboard 110 as the user 102 plays. In this manner, the user 102 can visually see themselves on the backboard 110 as the user 102 plays the shot timer game. Moreover, the control unit can digitally overlay the shot timer 116 and the shot counter 114 over the recorded image data on the display of the backboard. The recorded image data from the RGB camera can fill the entire display of the backboard 110. The shot timer 116 can be positioned in the upper left corner of the display and the shot count can be positioned in the bottom right corner of the display, to name an example. Other positions are also possible.

During stage (B), the one or more sensors included in the backboard 110 acquire sensor data 118 corresponding to the user 102 on the basketball court 108. As previously mentioned, the sensor data 118 can include data from the trip sensors, accelerometers, LIDAR sensors, and the motion sensors. For a particular shot attempt shown in system 100, the user 102's shot attempt was successful. The trip sensors can indicate that user 102's shot attempt was successful, as the basketball 106 passed through the rim 112. For example, the backboard 110 can include an array of 2 or more laser trip sensors that are vertically aligned coinciding with the hoop system. If a succession of the laser trip sensors are tripped in order from high to low, the control unit can determine that the basketball shot attempt was successful. Alternatively, if the laser trip sensors are not tripped in order from high to low, then the control unit can determine that the basketball shot attempt was unsuccessful.

The accelerometers can indicate a small vibration pattern because the path of the basketball 106 through the rim 112 resulted in a swish, or a successful shot that did not hit the rim 112 or the backboard 110. Alternatively, if the basketball 106 did hit the backboard 110 or the rim 112 through the successful shot attempt, the accelerometers can record a particular vibration pattern to indicate where the basketball 106 landed. The LIDAR sensors can detect a shot attempt of user 102 and characteristics of the user 102's shot attempt, e.g., angle and height of the basketball 106 during the shot attempt. The motion sensors can detect user 102 on the basketball court 108. Additionally, the motion sensors can detect movement of the user 102 and movement of the basketball 106.

In some implementations, the backboard 110 can acquire the sensor data 118 from the multiple sensors on a periodic basis. For example, the sensors can be configured to acquire sensor data 118 every 2 seconds, 5 seconds, or 10 seconds. In other examples, the sensors can be configured to acquire sensor data 118 based on the type of game being played by the user 102. For example, if the user 102 is playing the shot timer game, then the sensors can be configured to acquire sensor data 118 on a more frequent periodic basis to ensure all shot attempts, whether successful or unsuccessful, are accounted for. Moreover, the user 102 can adjust the sensitivity or frequency of the sensors acquisition through the client device 104 if the user 102 notices the basketball system 107 incorrectly counting shot attempts, and incorrectly counting makes and misses and vice versa, until the count is accurate. In another example, if the user 102 is playing a game where the user is required to shoot shots from set locations on the basketball court 108, then the sensors can be configured to acquire sensor data 118 on a less frequent basis because in between each shot, the user 102 has to rebound the ball and move to different set locations. To reduce the processing that has to occur by the sensors and control unit during games in which a user's goal is to shoot less but more precisely, which can reduce the overall complexity and processing performed by the sensors and the control unit.

During stage (C), the one or more cameras included in the backboard 110 acquire image data 122 corresponding to the user 102 on the basketball court 108. As previously mentioned, the image data 122 can include image data from the depth sensing cameras and the RGB cameras. For example, the image data 122 can include images or videos from each of the cameras. For example, as illustrated in system 100, the user 102's shot attempt was successful, as it passed through the rim 112. The depth sensing cameras can generate (i) detection data of the user 102 on the basketball court 108, (ii) movement data of the user 102, (iii) detection data of the basketball 106 used by the user 102, (iv) track movement data of the basketball 106, and (v) detection data of a body posture of the user.

As previously described, the depth sensing cameras can generate and track each of the different detection and movement data of the user 102 and the basketball 106. The depth sensing cameras can continuously record the image data 122 monitoring the user 102 on the basketball court 108 and generate this detection/movement data for each frame of the recorded image data 122. In some examples, the depth sensing cameras can provide this image data 122 and detection/movement in a real-time fashion to the control unit. Additionally, the RGB cameras can record the user 102 on the basketball court 108 and can provide the recorded image data 122 to the control unit. The control unit can receive the sensor data 118 and the image data 122 to generate characteristics of the user and the shot attempt.

During stage (D), the control unit can receive the image data 122 from the depth sensing and RGB cameras and provide the image data 122 to a trained machine-learning model. The control unit can train a machine-learning model to perform a variety of functions. The functions can include (i) classify or identify each user on the court 108 as a unique and persistent user, (ii) identify a user's shot, (iii) generate characteristics of the user on the basketball court 108, and (iv) generate characteristics of the shot attempt by the user.

For example, the trained machine-learning model can correspond to a convolutional neural network (CNN). The control unit can train the machine-learning model using different image data of successful shot attempts and unsuccessful shot attempts from various locations on different courts. The control unit can also train the machine-learning model using different image data of professional basketball athletes' shot attempts to understand the ideal shot attempt for assisting other users that interact with the basketball system 107. The control unit can provide image data of these professional athletes dribbling a basketball, shooting the basketball from various locations on the court, and moving while dribbling the basketball. In another example, the RGB and depth sensing cameras can be used to determine body posture of the user's shot attempt and the CNN can be trained on identified body posture in accordance with an ideal body posture, e.g., a professional athlete or other individual's ideal body posture during a shot attempt, or which body posture identification provides the best results.

In some implementations, the control unit can also train the machine-learning model to identify users that interact with the basketball system 107. For example, when a user, such as user 102, seeks to initially use the basketball system 107, the application on the client device 104 may request the user to enter their credentials and to take a picture or selfie of themselves. This will provide the control unit with an initial image to train the machine-learning model to detect user 102. Then, the control unit can instruct the user 102 to play with the basketball system 107 by taking shot attempts. The control unit can acquire image data 122 of the user 102 and train the machine-learning model using the newly acquired image data 122. The control unit can provide an indication on the display that the basketball system 107 is in learning mode to learn the user 102. Then, at a later point in time, and once the machine-learning model is sufficiently trained, the control unit can apply the trained machine-learning model to (i) identify user 102 as a unique user, (ii) identify a user's shot, (iii) generate characteristics of the user on the basketball court 108, and (iv) generate characteristics of the shot attempt by the user.

In some implementations, the trained machine-learning model can output the labeled data 126. The labeled data 126 can indicate on a frame of image data 122 an identification of the user 102 and a location of the user 102 relative to the backboard 110. For example, the labeled data 126 can indicate that user 102 is "Bob" and an (X,Y,Z) coordinate indicating where user 102 is located on the basketball court 108 relative to the basketball system 107. The labeled data can also indicate an angle of the basketball 106's trajectory for a particular frame of image data and an indication of whether the basketball 106 passes through the rim 112. For example, the angle of the basketball 106's trajectory can indicate that the basketball is at 101 degrees at a particular point in time relative to the basketball system. Additionally, the labeled data 126 can indicate that the basketball 106 did pass through the rim 112, e.g., was successful. In some examples, the labeled data 126 can include a statistic or percentage that indicates a likelihood that user 102 is "Bob", a likelihood where user 102 appears to be located, a likelihood of an angle of the basketball trajectory, and a likelihood of whether the basketball passes through the rim 112. These likelihoods can range from 0-100% or 0-1, for example.

If multiple users 102 are interacting with the basketball system 107, then the control unit can identify and track each of the users 102 simultaneously. For example, the control unit can receive sensor data from each of the sensors within the backboard 110 that monitors characteristics of each of the different users. The control unit can also receive image data from each of the cameras within the backboard 110 and provide that image data to the trained machine-learning model. In response, the machine-learning model can identify each of the users on the basketball court 108 and can track each of the users on the basketball court 108 and their corresponding movements with and/or without a basketball. The labeled data 126, output by the trained machine-learning model, can include a frame of image data with labels for each of the users in the frame and characteristics corresponding to each of the users, as described above. For example, the trained-machine learning model can track each of the users interacting with the basketball system 107 based on their jersey, jersey number, particular clothing types, and physical characteristics. In this case, the trained machine-learning model can also associate makes and misses of each shot attempt from each of the users on the basketball court.

In some implementations, the trained machine-learning model can also be used to generate real-time predictions of users' shots. For example, the trained machine-learning model can generate real-time predictions for each shot as the basketball travels towards the rim 112. For example, based on prior sensor data, image data, and current input data from the sensors and cameras, the basketball system 107 may initially predict the probability of a made shot when the ball is ten feet from the rim 112, e.g., 70.0% probability of the shot being successful. The trained machine-learning model may adjust the probability after the basketball 106 hits the rim 112, e.g., 55.0% probability of a made shot. The trained machine-learning model can be continuously updated/retrained with the predictions and the results of the shot attempts using the image data and the sensor data captured from the basketball system 107.

During stage (E), the control unit can analyze the received sensor data 118 to determine whether the shot attempt was successful or unsuccessful. For example, the control unit can first determine from the LIDAR sensors whether a shot attempt was detected. If the control unit determines that a shot attempt was detected, then the control unit can analyze the data from the trip sensors, which are located on the backboard 110 behind the rim, to determine whether the basketball 106 passed through the rim 112 or did not. If the shot did not pass through the rim 112, then the control unit can analyze the data provided by the accelerometers to determine the location the basketball 106 hit relative to the backboard based on a vibration pattern. If no vibration pattern was detected and an unsuccessful shot attempt was detected, then the control unit can determine the user missed the rim 112 and the backboard 110 during the unsuccessful shot attempt, e.g., named as an "air ball". In another example, if the control unit determines that the shot did not pass through the rim, and a vibration pattern was detected, then the control unit can determine whether the basketball 106 bounced off a front side of the backboard 110, a bottom side of the backboard 110, a top portion of the backboard, a side portion of the backboard, or a location on the rim 112, or a combination of each. The control unit can analyze the sensor data provided by the motion sensors and the LIDAR sensors to determine a location of the shot attempt and a trajectory or arc of the shot attempt. If the control unit determines that the shot did pass through the rim, the control unit can determine the vibration pattern to indicate how the basketball passed through the rim 112, e.g., off the backboard 110, off the rim, or a swish.

During stage (F), the control unit can perform analytics on the labeled data 126 provided by the trained machine-learning model 124 and data resulting from analytics of sensor data 118 during stage (E). Based on the labeled data 126 and the analytics performed on the sensor data 118, the control unit can generate output data 130. The output data 130 can include a location of user 132, an identification of user 134, an angle of ball trajectory 136, a shot attempt make/miss 138, and a recommendation 140 for improvement. The control unit can generate the output data and store the data in a digital data type, e.g., a struct, class, or other, for example. For example, as illustrated in system 100, the location of user 132 can indicate—"12.00, 1.01, 0.00" for X, Y, Z coordinates relative to the basketball system 107 and the basketball court 108 measured in feet. The identification of user 134 can correspond to a name or another identifier that identifies user 102, e.g., "Bob". The angle of ball trajectory 136 can correspond to an angle over the time of flight trajectory, e.g., 5 degrees at $t_9$, where time can be measured in seconds or milliseconds, for example. The shot attempt make/miss 138 can correspond to a "make", for example. In addition, the control unit can generate the recommendation 140 based on the analytics performed.

For example, the control unit can generate a recommendation to provide to the user 102 for improving the user's subsequent shot attempts based on the user 102's current shot attempt and previous shot attempts. The recommendations can correspond to improvements for (i) a body posture of the user, (ii) an arm angle of the user, (iii) a release point of the basketball during the shot attempt, and (iv) a trajectory of the basketball during the shot attempt. For example, the control unit can compare the body posture of the user 102 during the shot attempt to stored image data of body posture during shot attempts by professional athletes. The user 102 can indicate through the application of the client device 104 that they wish to shoot like a particular professional athlete. The control unit can display to the client device 104 and/or the display of the backboard 110 a side-by-side image data of the user 102 shooting the basketball and image data of the professional athlete shooting the basketball. In this manner, the user can try to practice their shooting form to match the professional athlete's shooting form shown on the display. The control unit can determine a closeness of shooting forms by comparison and provide a percentage, for example, to the user to indicate how close their body posture is to the professional athlete's during the shot attempt. In this manner, the user 102 is able to improve their body posture during the shot attempt over time.

The control unit can also analyze the arm angle of the user 102 or limb of the user 102 during the shot attempt. The arm angle can be angled outward, angled inward, or some angle in between during the shot attempt, for example. The control unit can indicate to the user 102 to adjust their arm angle for subsequent shots to align better with a professional's arm angle. Alternatively, the control unit can indicate to the user 102 to adjust their arm angle to improve chances of subsequent shot attempts being successful. The indication can be displayed on the display of the backboard 110 or on a client device 104 as image data, e.g., video, or another form. Similarly, the control unit can analyze the release point of the basketball 106 during the user's shot attempt and a trajectory of the basketball 106 during the user's shot attempt and provide recommendations to improve those based on another player's shot release point and trajectory, and to improve the chance a shot is successful.

In some implementations, the control unit can generate a profile for user 102. The profile can include an identification of user 102, e.g., user named Bob, the credentials of the user 102, one or more client devices associated with the user 102, e.g., client device 104, and characteristics of the user 102 during shot attempts. For example, the characteristics of the user 102 during shot attempts can include the classification of the user and the location of the user on the basketball court 108 relative to the backboard 110 during the shot attempt. Additionally, the characteristics of the user 102 can include a wingspan, a height, hand size, and speed of that user. The characteristics can also include prior shot attempts of the user 102, such as characteristics of the basketball 106's travel during the shot attempt, e.g., height, angle, trajectory point, vertical jump of user, and release point, at different time instances. The control unit can also store in the profile whether the prior shot attempts resulted in a make or miss as well as if the shot was made, a type of shot, e.g., a make that bounced off the backboard 110, a make that bounced off the rim 112, or a make that swished through the net of the basketball system 107. The control unit can also store the sensor data 118, the image data 122, the labeled data 126, and the output data 130 with the profile.

In some implementations, the control unit can also store game performance or game data associated with the game played by the user 102 in the profile that corresponds to user 102. The type of games played can include, for example, training session modes, local head-to-head matchups, live stream mode, and worldwide competition mode. For example, the game performance can include that represents the game played, a date and time the game was played, a number of players in the game, an identification of each player playing the game, a final score of the game, makes and misses for each for each player during the game, locations on the basketball court of each of the makes and misses from each player, and a time at which each make and miss occurred for each player in both absolute time and in relative time (relative to the start of the game). The control unit can store the game data as a tuple, struct, class, or some other computer format. If multiple users are playing a single game, then the control unit can store game data for each of the users in their corresponding profile for that single game.

The control unit can store the profile on the external server for the user 102. The control unit can access and retrieve the profile for the user 102 when the profile is updated, based on newly received sensor and image data. For example, the control unit can identify a user profile based on facial recognition from the received image data, user 102's input of username and password, iris recognition from the received image data, a matching fingerprint, or some other suitable authentication or identification method. Once the control unit identifies a user profile corresponding to the user 102, the control unit can access the corresponding profile from the external server and update its contents. Once completed with updating the profile for user 102, the control unit can update the external server with the revised profile.

During stage (G), the control unit can provide the output data 130 for the user 102's review. The control unit can provide the output data 130 for the user 102's review in a variety of ways. In one way, the control unit can provide the output data 130 to the client device 104 for the user 102 to review. In this manner, the user 102 can view the output data 130 for the most recent shot attempt to analyze, for example, angle of ball trajectory 136, the recommendation 140, and the location of user 132. In some examples, the control unit can provide the output data 130 to the display of the backboard 110 and the user can interact with the backboard 110 via verbal or hand waving commands to view the output data 130. In this manner, the user 102 can seek to improve their basketball skillset for subsequent shot attempts based on the output data 130 characterized by the basketball system 107 for the most recent shot attempt.

In some implementations, the control unit can also provide the generated profile of the user to the client device 104 for the user 102's review. The user 102 can access the application on their client device 104 to view the profile generated for them by the control unit. In particular, the user 102 can view data from prior shot attempts to analyze how the user's shot attempts have progressed in the profile. For example, the user 102 can view the sensor data 118, the image data 122, the labeled data 126, and the output data 130 for each prior shot attempt on their client device 104. In some examples, the control unit can display the profile on the display of the backboard 110 and the user can interact with the profile via verbal or hand waving commands.

In some implementations, the control unit can provide encouragement recommendations to the user 102 as the user 102 plays the game. For example, if the control unit notices the user 102 has a low shot make to shot attempt ratio, the control unit can provide an audible message 146 through the speakers of the backboard 110. The audible message 146 can be heard by the user 102, e.g., saying "6 minutes to go! Keep shooting." In another example, if the control unit notices the user 102's shot attempt was successful, the control unit can provide another audible message 144 through the speakers of the backboard 110 that recites "Great Shot!" The control unit can also provide other audible messages to the speakers of the backboard 110 or to the client device 104. Each of these messages of encouragement can also be stored with the user 102's profile.

The user 102 can continue playing the shot timer game until the time exhibited on the shot timer 116 elapses. Afterwards, the user 102 can select another game to play with the basketball system 107, review analytics generated by the basketball system 107 on either the display of the backboard 110 or the client device 104, or turn off the basketball system 107. In some examples, the user can turn the basketball system 107 via the application on the client device 104.

In some implementations, a miniature-sized backboard can be provided in system 100. The miniature-sized backboard can include similar components and functionality compared to those described with respect to backboard 110 of system 100. The miniature-sized backboard may not include a pole 113, but instead, may be placed in various locations within a home, a corporate building, or other areas. For example, a user may be able to mount the miniature-sized backboard on a wall in a home or hang the miniature-sized backboard over a particular side of a door or a closet. The miniature-sized backboard may include multiple anchor points on a rear side of the backboard for being attached to various attachment points. These anchor points can be attached by, for example, rope, hooks, screws, fasteners, and other attachments. The miniature-sized backboard may include a rim with a net connected to its front side. In other examples, a user may be able to mount the miniature-sized backboard on a surface in a garage, basement, or, other areas within a home or corporate property. In other examples, the miniature-sized backboard may include a small pole with a base for support that can be placed in any location and a user can shoot a smaller size basketball at its rim. These locations can include, for example, bedrooms, basements, kitchens, office spaces, living rooms, and other places.

In some implementations, the miniature-sized backboard can include fewer components than the backboard 110 while maintaining similar functionality. The number of sensors within the miniature-sized backboard may be reduced because the size of the miniature-sized backboard can be substantially smaller than the backboard 110. For example, the miniature-sized backboard may include two depth-sensing cameras, instead of three to eight, with overlapping fields of view for viewing the area where a user is shooting a basketball. The rim of the miniature-sized backboard is also substantially smaller, than the rim of the backboard 110. Due to the rim size of the miniature-sized backboard, the basketball used for the miniature-sized backboard is also substantially smaller.

The miniature-sized backboard can include a similar number of games to play as the backboard 110 and include an ability to connect with other miniature-sized backboards located in other geographic regions, over a network. In some cases, the miniature-sized backboard can include an ability to play basketball games with users at other regular sized backboards, e.g., such as backboard 110, in different geographic regions over a network. A user can interact with the miniature-sized backboard by communicating with the miniature-sized backboard verbally, by way of hand gestures, or by interacting with a smart application of their client device that communicates with the miniature-sized backboard, similar to how a user would interact with backboard 110.

Figure 1B:
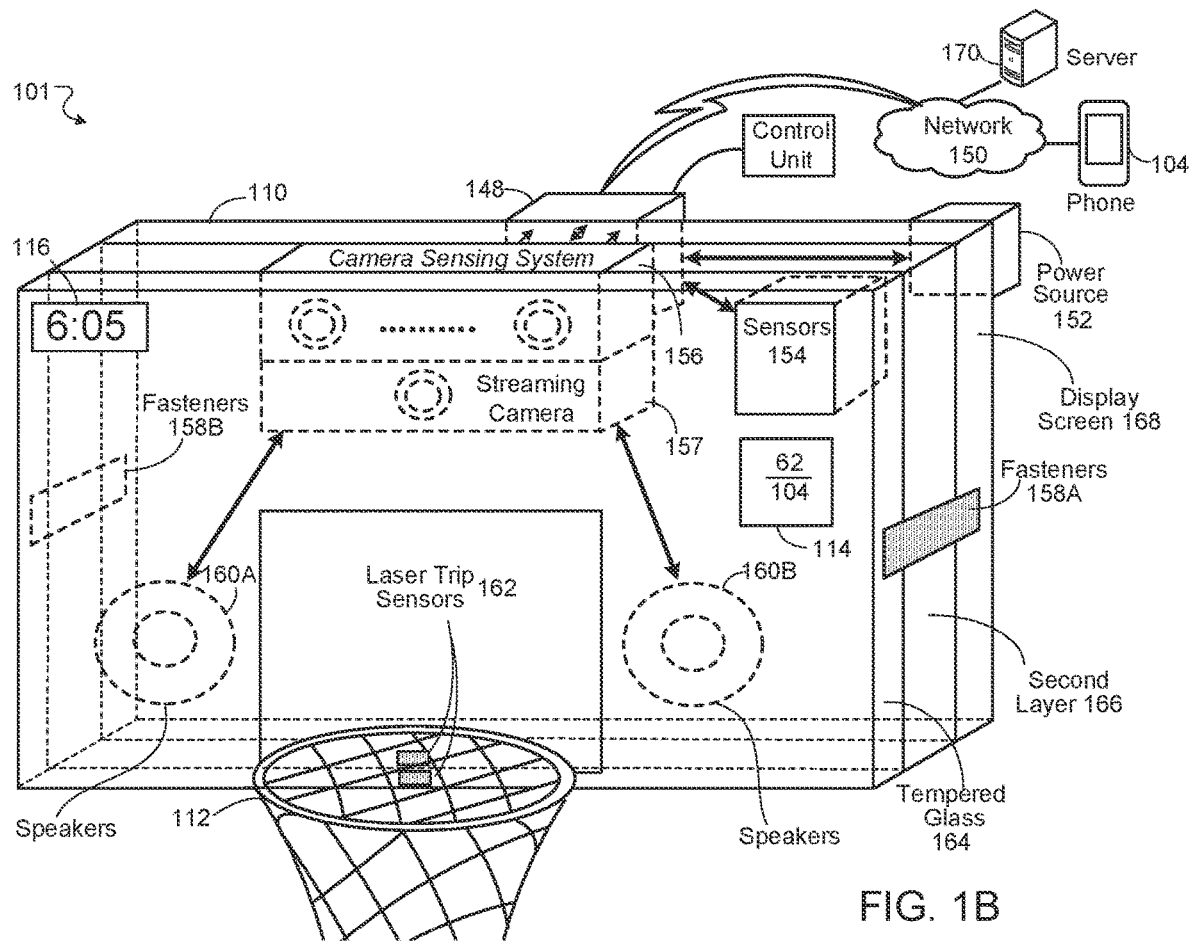
FIG. 1B is a block diagram that illustrates an example of a system of a backboard.

FIG. 1B is a block diagram that illustrates an example of a system 101 of a backboard. The system 101 illustrates, in detail, a structure of the backboard 110. This backboard 110 shown in system 101 is similar to the backboard 110 illustrated in system 100.

The system 101 includes the backboard 110, a network 150, a client device 104, and an external server 170. The backboard 110 includes a front layer 164, a second layer 166, and a display screen 168. The front layer 164, the second layer 166, and the display screen 168 are positioned in a longitudinal, layered, or stacked manner, but could be arranged in any suitable configuration. The system 101 includes fasteners 158A and 158B that can hold together in position the various layers of the backboard 110. In some cases, the number of layers of the backboard 110 can be less than three layers, as will be further illustrated and described below. The backboard 110 is IP67 waterproof regulated and can weigh near 300 pounds, for example.

The fasteners 158A and 158B can be shock-absorbing fasteners that couple the different layers of the backboard 110. The fasteners 158A and 158B can be any suitable devices that absorb and/or minimize transfer of shock forces and/or vibration from the rim 112 and/or the front layer 164 to the display screen 168. In one example, the fasteners 158A and 158B can include one or more brackets and a spring, screws, rivets, bolts, or other suitable mechanisms. In another example, the fasteners 158A and 158B can include one or more adhesives, sealants, or other suitable mechanisms.

In some implementations, the front layer 164 of the backboard 110 can protect the components within the backboard 110. For example, the front layer 164 can be tempered glass, covered with a protective coating with a translucent or transparent material, such as anti-reflective coating, or both. The front layer 164 can also be configured to enable a user, such as user 102, interacting with the backboard 110 to view the display screen 168 in a third layer of the backboard 110. The front layer 164 can also be connected to the rim 112 at the bottom portion of the front layer 164. The second layer 166 of the backboard 110 can include a small region between the front layer 164 and the display screen 168 that includes the one or more components of the backboard 110.

For example, the second layer 166 can include the camera sensing system 156, the streaming camera 157, the sensors 154, and the speakers 160A and 160B. The camera sensing system 156 can include one or more depth sensing cameras that view the basketball court 108 and are positioned at a top portion and in the center of the second layer 166. The streaming camera 157 can include one or more RGB cameras that view the basketball court 108 and can be positioned below the camera sensing system 156. In some examples, the second layer 166 can be a compressible material such as rubber or foam padding.

The sensors 154 can positioned in a variety of locations within the second layer. For example, the LIDAR can be positioned within the camera sensing system 156. The motion sensors can be positioned within the camera sensing system 156. The trip sensors 162 can be laser trip sensors that are positioned at the bottom of backboard 110 on the front layer 164 behind the rim 112 in a vertical manner. The speakers 160A and 160B can be positioned within the second layer 166 of the backboard 110. The speakers 160A are capable of playing music and/or providing audible feedback to the user 102. The accelerometers can be positioned within the sensors 154 of the second layer 166. The microphone(s) can be positioned within the sensors 154 of the second layer 166.

As previously mentioned, the sensors 154, including the trip sensors 162, can sense the player, the ball, and/or forces applied to the basketball system 107. The sensors 154 generate data that is processed and analyzed by the control unit 148. Each of the sensors 154 can be configured in a particular manner to properly detect, acquire, and generate sensor data for the user playing basketball. The sensors 154 can be coupled to the front layer 164, the display screen 168, the pole 113, or the second layer 166. In some examples, the sensors 154 can also be remote or disconnected from the basketball system 107. For example, the sensors 154 can be coupled to existing court lighting systems and/or auxiliary support structures along the sides or ends of the basketball court 108.

The control unit 148 can be positioned behind the display screen 168 of the backboard 110. Each of the sensors, cameras, speakers, and microphones can connect to the control unit 148 in a bi-directional manner. The control unit 148 can communicate with the external server 170 and the client device 104 over the network 150. The network 150 can be, for example, the Internet, Wi-Fi, Bluetooth, Ethernet, or some other form of wireless or wired connection.

The display screen 168 can display the shot timer 116 and the shot counter 114. The user 102 can see the shot timer 116 and the shot counter 114 through the front layer 164 and the second layer 166. The user 102 can also see image data displayed on the display screen 168 by the control unit, e.g., video footage of user 102 playing basketball in real time or video footage of another user playing basketball from another connected control unit. The control unit can overlay the shot timer 116 and the shot counter 114 digitally over video footage provided to the display screen 168. Moreover, the square of the backboard 110 can be generated and displayed by the display screen 168.

The display screen 168 can visually display information, indicia, videos, and/or pictures. The display screen 168 can have a brightness of 1000 or more NITS. The display screen 168 can be any suitable display panel such as, for example, an LED or LCD display screen. For example, the display screen 168 can be a smart TV. The display screen 168 can also be a screen for projection of information, indicia, videos, and/or pictures. For example, a projector may project information to the display screen. In another example, the display screen 168 can include a short throw projector for providing information, indicia, videos, and/or pictures as the display. The client device can stream any image data to the display screen 168 for a user's view.

The system 101 also includes the power source 152. As previously mentioned, the power source 152 can power the one or more components within the second layer 166 of the backboard 110, the display within the backboard 110, and the control unit. The power source 152 can include, for example, a power plug that is inserted into an outlet, a solar energy panel coupled to the basketball system 107, or a rechargeable battery pack attached or coupled to the basketball system 107. The power source 152 can be located on a rear side of the display screen 168.

Figure 1C:
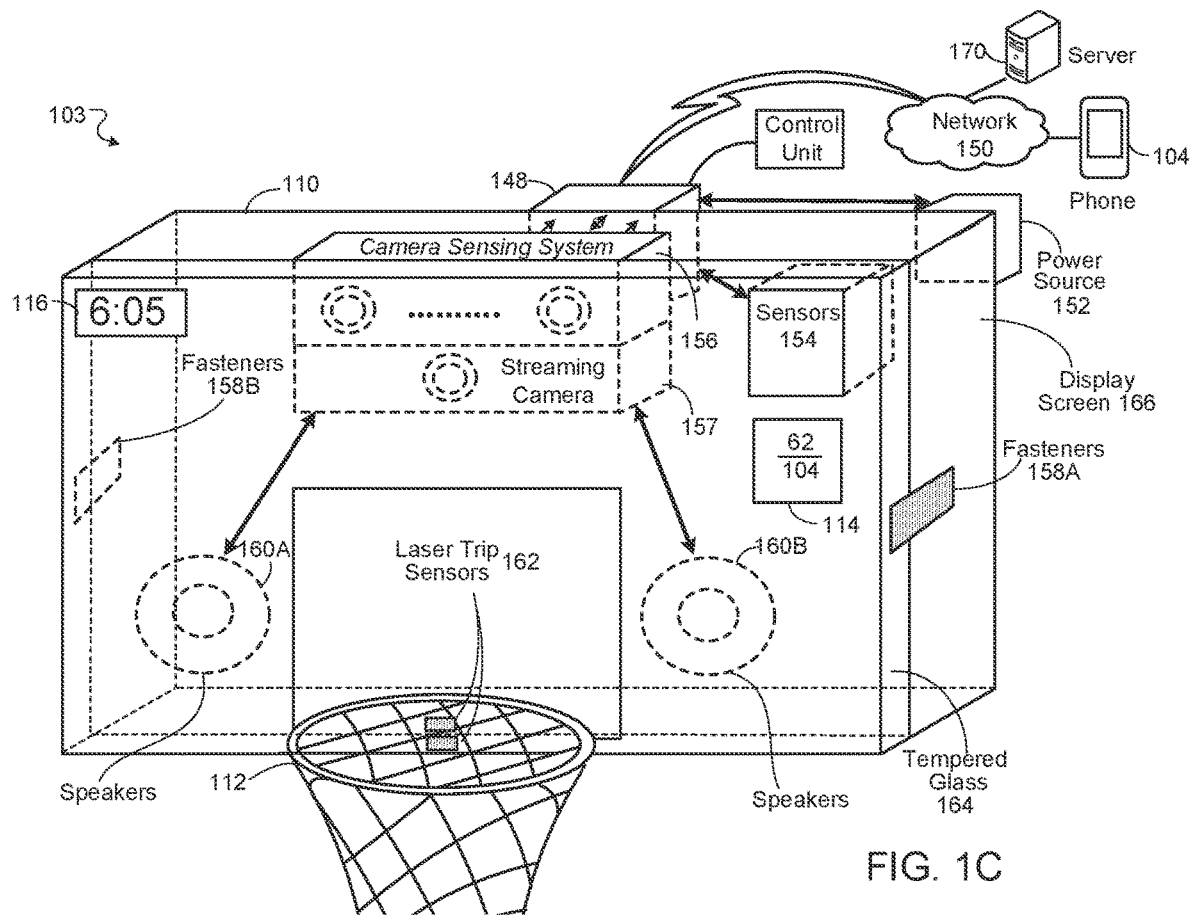
FIG. 1C is another block diagram that illustrates an example of a system of a backboard.

FIG. 1C is another block diagram that illustrates an example of a system 103 of a backboard. The system 103 includes similar components to the backboard 110 illustrated in system 101. However, the backboard 110 in system 103 includes two layers, e.g., front layer 164 and the display screen 167. The different components of the backboard 110 can be positioned and configured to operate in three layers and two layers, as illustrated and described in system 101 and 103, respectively.

In system 103, the front layer 164 and the display screen 168 can be spaced apart a predetermined amount to reduce the shocks during a user's shot attempt. For example, the front layer 164 and the display screen 168 can be spaced apart by 0.5-1.0 inches so that when the basketball strikes the front layer 164, the front layer 164 will not contact with the display screen 168 as the front layer 164 vibrates or flexes.

In another example, the display screen 168 tightly abuts the front layer 164. In this example, the front layer 164 is formed from a generally rigid plexiglass or other suitable material and there is minimal or no space between the front layer 164 and the display screen 168. As such, the front layer 164 does not move relative the display screen 168 when the basketball contacts the front layer 164. Thus, the display screen 168 is not damaged when the basketball contacts the front layer 164. In this example, the pole 113 or the support member is embedded in the ground and the connection between the pole 113 and the display screen 168 and/or the front layer 164 is rigid such that the forces applied by the basketball to the front layer 164 are transmitted to the ground thereby minimizing vibrations and rattling of the display screen 168.

Figure 2A:
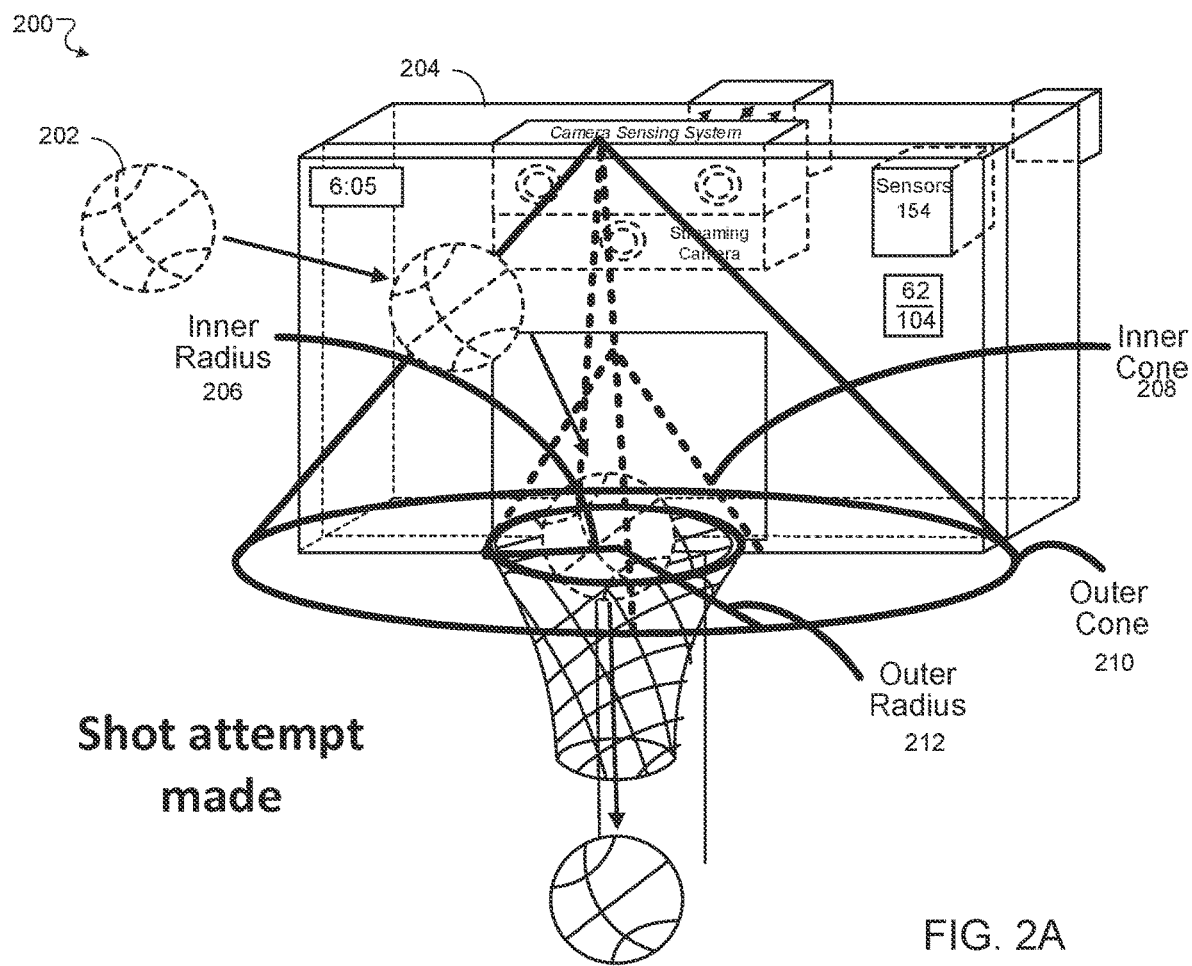
FIG. 2A is a block diagram that illustrates an example of video analytics for detecting a basketball passing through a rim.

FIG. 2A is a block diagram that illustrates an example of video analytics 200 for detecting a basketball passing through a rim. In particular, the video analytics 200 illustrate processes performed by the control unit when determining that a shot attempt was successful, e.g., the basketball passed through the rim of the backboard. The video analytics 200 illustrates similar components to systems 100, 101, and 103, and the similar components do not need to be described again here.

The video analytics 200 includes a basketball 202 shot by a user, the backboard 204, and virtual regions. The virtual regions include a virtual inner cone 208 and a virtual outer cone 210. The control unit can apply the virtual inner cone 208 and the virtual outer cone 210 to the received image data from the depth sensing cameras.

The virtual inner cone 208 and the virtual outer cone 210 can include one or more characteristics that are placed above the rim. For example, the virtual inner cone 208 can include an inner radius 206 that matches to a radius of the rim. The virtual inner cone 208 includes a base that coincides with the rim. The virtual inner cone 208 also has a particular height that extends from the rim. For example, the height of the virtual inner cone 208 can be 1 foot. Similarly, the virtual outer cone 210 can include an outer radius 212 that includes the radius of the rim and a distance greater than the radius of the rim. For example, the outer radius 212 can correspond to 2.5 feet or another distance. The virtual outer cone 210 can include an extrusion the size of the virtual inner cone 208 so that the two virtual cones do not overlap one another. The virtual outer cone 210 also has a particular height that extends from the rim. For example, the height of the virtual outer cone 210 can be 4 feet or another height. The control unit can utilize the characteristics of the virtual cones displaced over the rim to determine whether a shot attempt resulted in a successful or unsuccessful shot.

For example, as illustrated in video analytics 200, the user performs a shot attempt by shooting the basketball 202 toward the backboard 204. The control unit can deem a shot attempt was successful when (i) the basketball 202 enters the virtual outer cone 210, then (ii) the basketball 202 exits the virtual outer cone 210, then (iii) the basketball 202 enters the virtual inner cone 208, and finally, (iv) the basketball 202 only exits the virtual inner cone 208 through the base of the virtual inner cone 208, e.g., into the rim of the basketball system. At this point, the control unit can deem the shot attempt was successful, as the basketball 202 passed through the rim of the basketball system. The control unit can perform these video analytics to determine if a shot attempt was successful during the analytics 128 of system 100.

Figure 2B:
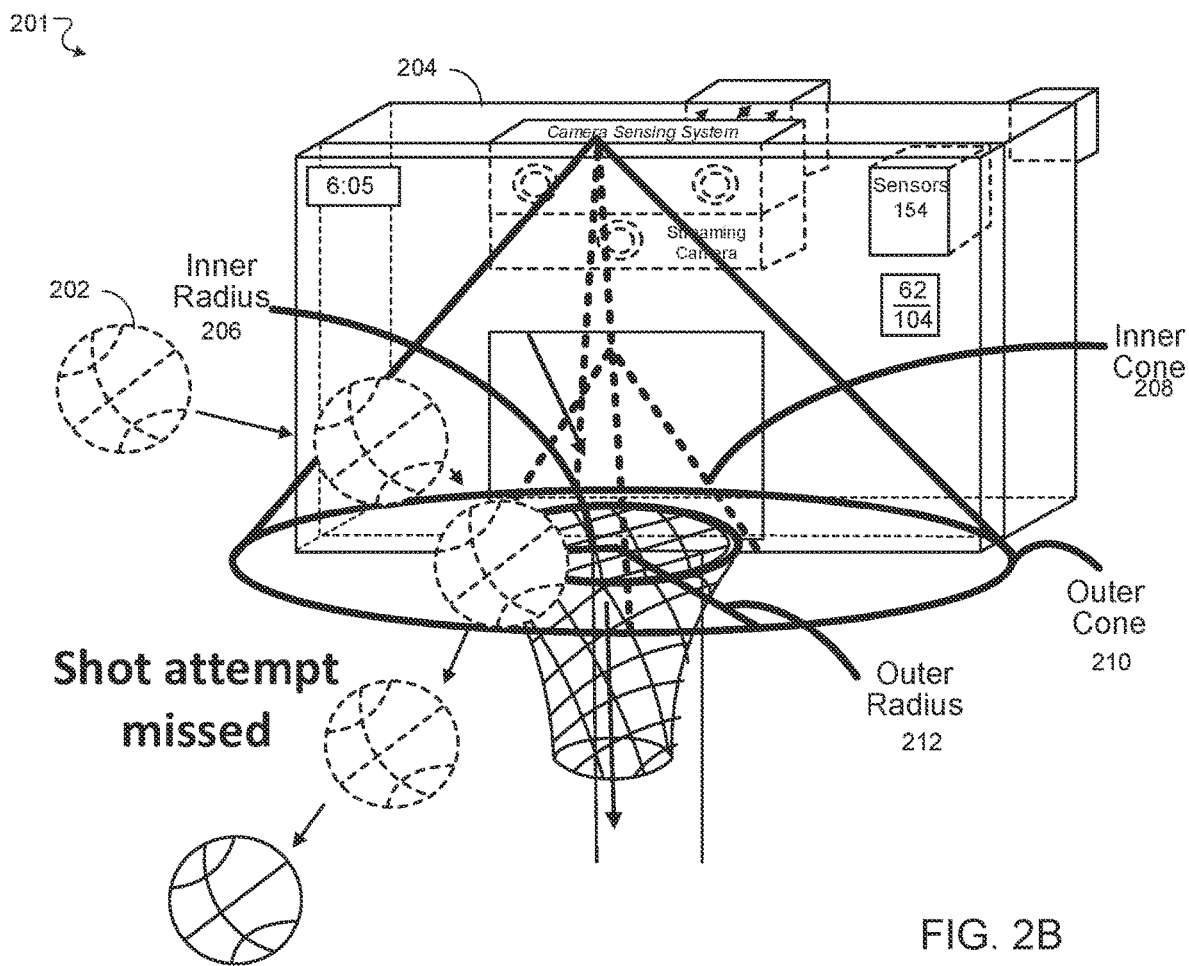
FIG. 2B is a block diagram that illustrates an example of video analytics for detecting a basketball not passing through a rim.

FIG. 2B is a block diagram that illustrates an example of video analytics 201 for detecting a basketball not passing through a rim. The video analytics 201 illustrate similar components to video analytics 200, which will not be described again here. The video analytics 201 can illustrate the processes performed by the control unit when determining that a shot attempt was unsuccessful, e.g., the basketball did not pass through the rim of the backboard. Additionally, the video analytics 201 illustrate similar components to system 100, 101, and 102, and the similar components do not need to be described again.

As illustrated in video analytics 201, the user performs a shot attempt by shooting the basketball 202 toward the backboard 204. The control unit can deem a shot attempt was unsuccessful in a variety of manners. In one example, if the basketball 202 does not enter either the virtual outer cone 210 or the virtual inner cone 208, then the control unit can deem the shot attempt unsuccessful. In another example, the basketball 202 may enter the virtual outer cone 210 and then exits out of the virtual outer cone 210 without entering the virtual inner cone 208, then the control unit can deem the shot attempt unsuccessful. In another example, the basketball 202 may enter the virtual outer cone 210, then the basketball 202 exists the virtual outer cone 210, and finally, the basketball 202 does not exit the virtual inner cone 208 through the base, then the control unit deems the shot attempt unsuccessful. The control unit can perform these video analytics to determine if a shot attempt was unsuccessful during the analytics 128 of system 100.

Figure 3:
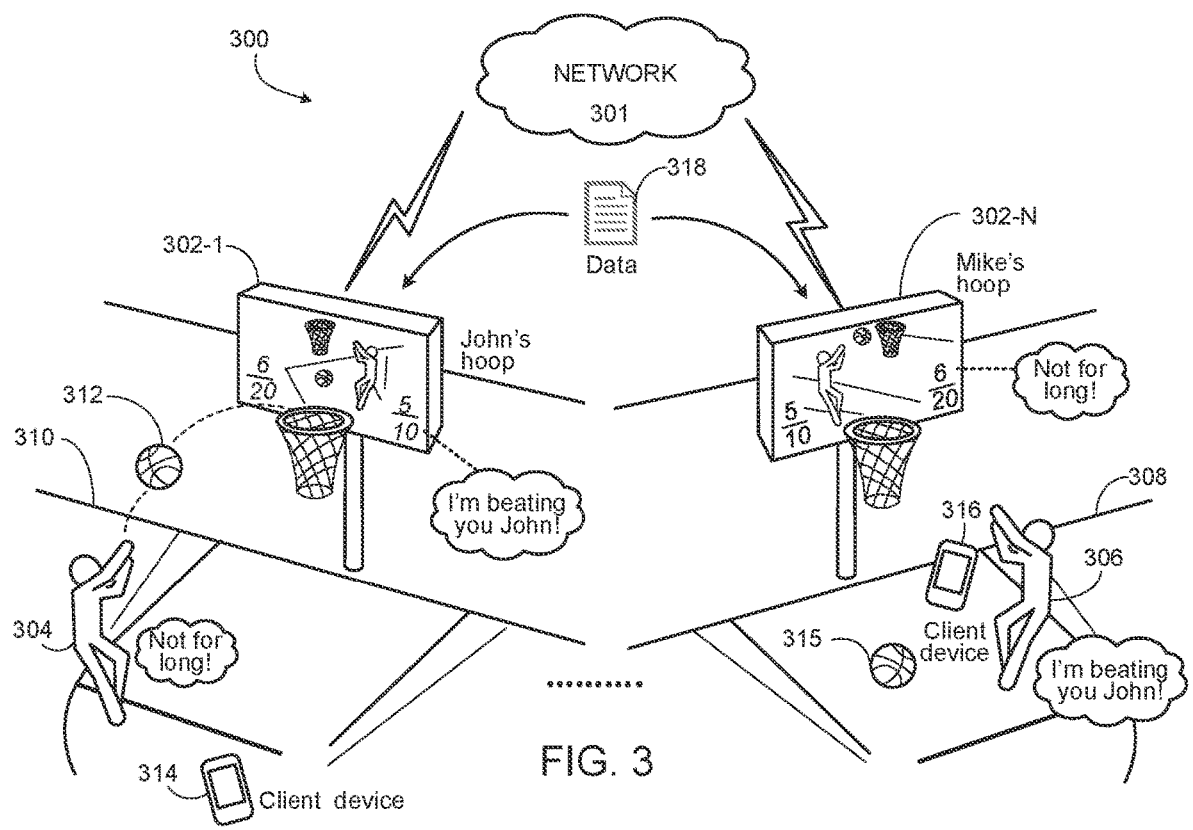
FIG. 3 is a block diagram that illustrates an example of a system of two users playing basketball with connected basketball systems.

FIG. 3 is a block diagram that illustrates an example of a system 300 of two users playing basketball with connected basketball systems. As previously mentioned, the basketball system, such as basketball system 107 of FIG. 1A, enables users to play various basketball games. The various basketball games can include, for example, training session mode, head-to-head matchup mode, worldwide competition mode, and live stream mode, to name a few. The system 300 illustrates an example of a head-to-head matchup mode between two different basketball systems.

System 300 illustrates a basketball system 302-1 and 302-N taking part in a head-to-head competition. The basketball system 302-1 and the basketball system 302-N communicate with one another via their respective control units over a network 301. The network 301 can be, for example, the Internet, Wi-Fi, or another form of connection.

At the basketball system 302-1, a user 304 can register with the basketball system 302-1 with their client device 314 to play a head-to-head game. The user 304 can play on the court 310 using the basketball 312. Similarly, at the basketball system 302-N, another user 306 can register with the basketball system 302-N with their client device 316 to play a head-to-head game. The user 306 can play on the court 308 using the basketball 315.

In some implementations, the user 304 can transmit a request to the basketball system 302-1 to play in the head-to-head competition. The user 304 can provide an indication or request through an application on the client device 314 to play in a head-to-head competition game to the basketball system 302-1. The indication or request can also indicate whether the user 304 desires to play against a friend or a random match. If the user 304 selects a friend, the basketball system 302-1 can seek to send out a request to the basketball system associated with the friend, e.g., basketball system 302-N. Alternatively, if the user 304 selects a random match, then the basketball system 302-1 can retrieve each of the other basketball systems that are currently online and are currently listed in a queue, are also requesting to perform a head-to-head competition, and can randomly select one of those basketball systems in the queue to play against the user 304 from the basketball system 302-1. Alternatively, the basketball system 302-1 can select the top basketball system in the queue to play against the user 304.

Similarly, the user 306 can provide an indication or request through an application on the client device 316 to play in a head-to-head competition game to the basketball system 302-N. The basketball system 302-N can determine whether the user 306 requested for a friend match or a random matchup. Based on the request, the basketball system 302-N can communicate out to another basketball system to setup the head-to-head competition. For example, the control unit of the basketball system 302-1 can transmit a request 318 to the control unit of the basketball system 302-N. The control unit of basketball system 302-N can setup the head-to-head competition in response to receiving the request 318 and responding to the request 318 with an acceptance.

The basketball system 302-1 and the basketball system 302-N can be located in different geographic regions. For example, the basketball system 302-1 can be located in a gymnasium in New York City, New York, and the basketball system 302-N can be located in a gymnasium in Geneva, Switzerland. In other examples, the basketball system 302-1 can be located at one house, and the basketball system 302-N can be located at a neighbor's house. In other examples, the basketball system 302-1 and the basketball system 302-N can be located at opposite ends of the same basketball court. As long as the basketball systems can connect to a network connection, e.g., the Internet, then the basketball systems can connect to one another. In other implementations, the basketball systems do not need an internet connection to communicate with one another. Rather, the basketball systems can communicate over a cellular connection that has a particular throughput and consistent network connectivity.

In response to the basketball systems 302-1 and 302-N accepting a head-to-head competition, a head-to-head module executes at both basketball systems. For example, the backboard of basketball system 302-1 displays a recorded live video stream of user 306 playing basketball. Similarly, the backboard of basketball system 302-N displays a recorded live video stream of user 304 playing basketball. One or more RGB cameras at the basketball system 302-1 records image data of the court 310 where user 304 plays, and provides the recorded image data to the control unit of basketball system 302-1. The control unit of the basketball system 302-1 transmits the recorded image data over network 301 to the control unit of basketball system 302-N, to be displayed on the display screen of the basketball system 302-N. Similarly, one or more RGB cameras at the basketball system 302-N records image data of the court 308 where user 306 plays, and provides the recorded image data to the control unit of basketball system 302-N. The control unit of the basketball system 302-N transmits the recorded image data over network 301 to the control unit of basketball system 302-1, to be displayed on the display screen of the basketball system 302-1. This process occurs simultaneously so user 304 can see user 306 playing on backboard of basketball system 302-1 and so user 306 can see user 304 playing on backboard of basketball system 302-N.

Additionally, both users can speak one another during the head-to-head competition. For example, user 306 can speak "I'm beating you John!" The microphone of the basketball system 302-N can pick up the audible message, provide the audible message to the control unit, and the control unit can transmit the audible message to the control unit of the basketball system 302-1. There, the control unit of the basketball system 302-1 can play the audible message through the speakers of the basketball system 302-1, where user 304 can hear the message "I'm beating you John!"

User 304 can respond by speaking a verbal message "Not for long!" The microphone of the basketball system 302-1 can pick up the verbal message and transmit the message to the control unit of the basketball system 302-1. The control unit of the basketball system 302-1 can then transmit the verbal message to the control unit of the basketball system 302-N, where the control unit of the basketball system 302-N receives the verbal message and provides the verbal message to be displayed by the speakers of the basketball system 302-N, e.g., speakers playing "Not for long!"

When the gameplay for the head-to-head competition begins, either with a "3-point contest", "a free throw contest," or "most shots in under a predetermined time", basketball systems 302-1 and basketball systems 302-N will start a countdown that is visually and/or audible played, e.g., "3, 2, 1, GO!" Both users 304 and 306 begin shooting their respective basketballs 312 and 315 towards their basketball system 302-1 and basketball system 302-N, respectively. Both basketball systems 302-1 and 302-N can use their respective cameras and sensors to monitor each users' shots, shot attempts, using processes described above. The display screen of basketball system 302-1 can display both the ratio of shots made to shot attempts for user 304, e.g., 6/20, and the ratio of shots made to shot attempts for user 306, e.g., 5/10. Similarly, the display screen of basketball system 302-N can display similar ratios. The control unit of both can track the shots made and shot attempts and provide this information, along the image data recorded by the RGB cameras, to the other control unit. In this manner, the control unit of basketball system 302-N can display the ratio of shots made to shot attempts for user 304 on the display screen of basketball system 302-N and the control unit of basketball system 302-1 can display the ratio of shots made to shot attempts for user 306 on the display screen of basketball system 302-1. Any update for shot attempts and shots made by both users is provided to both control units over the network 301 so their displays can update respectively.

The display screens of both basketball systems 302-1 and 302-N may display a timer if this is a timed competition. The timer between both display screens will be synced to ensure both users have the same amount of time for the head-to-head competition. Once the timer elapses, the winner with the highest ratio of shots made to shot attempts is deemed the winner of the competition.

Similar to stage (G) of system 100, the control unit for the basketball system 302-1 can provide output data for each attempted shot to the client device 314 for user 304's review. The control unit for the basketball system 302-N can provide output data for each attempted shot to the client device 316 for user 306's review. The control unit for the basketball system 302-N can also provide the output data to the control unit of basketball system 302-1 and/or client device 314 for user 304 to review their opponents results. The control unit for the basketball system 302-1 can also provide the output data to the control unit of basketball system 302-N and/or client device 316 for user 306 to review their opponents' results. Similarly, both control units can associate image data, sensor data, and the output data for each shot attempt with the profile of the respective users. For example, the control unit of basketball system 302-1 can store the image data, the sensor data, and the output data for each shot attempt by user 304 in their profile. The control unit of basketball system 302-N can do the same storage procedure for user 306 and associated profile.

A similar process can be performed as described above with respect to system 300, should user 306 and user 304 play basketball at the same basketball system, e.g., basketball system 302-1. In this case, the components of the basketball system 302-1 can monitor both the user 304 and corresponding basketball 312 and user 306 and corresponding basketball 315. The control unit of the basketball system 302-1 can display the ratio of shots made to shot attempts for both users as they perform shot attempts on the display screen of the basketball system 302-1. In this example, the display screen of the basketball system 302-1 can display a video recorded from the RGB camera of the basketball system 302-1 of both users playing on the basketball court 310 as they play. The ratio of shots made to shot attempts for both users can be overlaid on the display screen over the video recorded from the RGB camera. In this case, both users can see their respective scores, e.g., respective ratios, and the recorded video of both user's gameplay.

In some implementations, these game plays can rank users that interact with basketball systems around the world. For example, the outcome of the head-to-head competition can result in user 304 winning and user 306 losing. As such, user 304's rank will move upwards and user 306's rank will move downwards amongst a list of other users. Users can seek to play games against other users using this ranking of players by way of their respective client device or basketball systems.

In another gameplay mode, livestream video highlights or real time basketball can be streamed to a basketball system. For example, while user 304 performs various shot attempts with basketball 312, the basketball system 302-1 can display basketball highlights from collegiate or professional basketball games. These games can include NBA games, college games, and high school games.

In another gameplay mode, the basketball systems can enable worldwide competition mode. In worldwide competition mode, two basketball systems are connected and play a game similar to the head-to-head matchup mode. Additionally, the worldwide competition mode enables two users to wager money on the head-to-head matchup. The wagered money can be managed to a financial account of the winner and the money can be used to purchase additional paid-features of the system. The paid-features of the system can include paying for premium live-remote one on one training, paying for special celebrity group coaching events, and other exclusive events.

In another game play mode, the basketball systems can enable users to play in a training mode. The user, such as user 304, can select the training mode when the user seeks to improve his or her basketball skillset. For example, when the training mode starts, the user can select a series of inputs from either the user's client device or the backboard of the basketball system. The series of inputs can include, for example, "work on shooting," "ball handling," "foot speed," "catch and shoot," among other practice modes. The user can select which input they wish to practice or multiple inputs to practice. Then, the user is instructed to start practicing based on instructions provided by the training module. The control unit of the basketball system 302-1 can sense shot parameters, e.g., shot attempts, shot makes, shot misses, dribbling, body posture, ball movement, and body movement to name a few examples, based on data provided by the sensors and cameras during the training module. In response, the control unit can generate output data, e.g., output data 130, for each attempted action, e.g., shot, dribble, ball movement, and user movement, and can store the output data for each attempted action associated with the user's profile.

The training module can end when a particular event occurs for the training module, e.g., the user makes 50 free throw shots, the user makes 50 three point shots, or the user learns how to dribble the basketball through their legs. In response to the training module ending, the control unit can provide the output data to a display screen of the basketball system and/or to the client device of the user. The output data can include workouts and other recommendations to help the user improve their basketball skillset. If the user comes back later to perform a similar training module, the control unit can determine whether the user has improved or declined ability from the prior training module or from prior training modules. The control unit can then indicate this information to the user via the client device or the display screen, e.g., displaying "You have improved your shot percentage by 20% in 5 minutes since the last training session."

Figure 4:
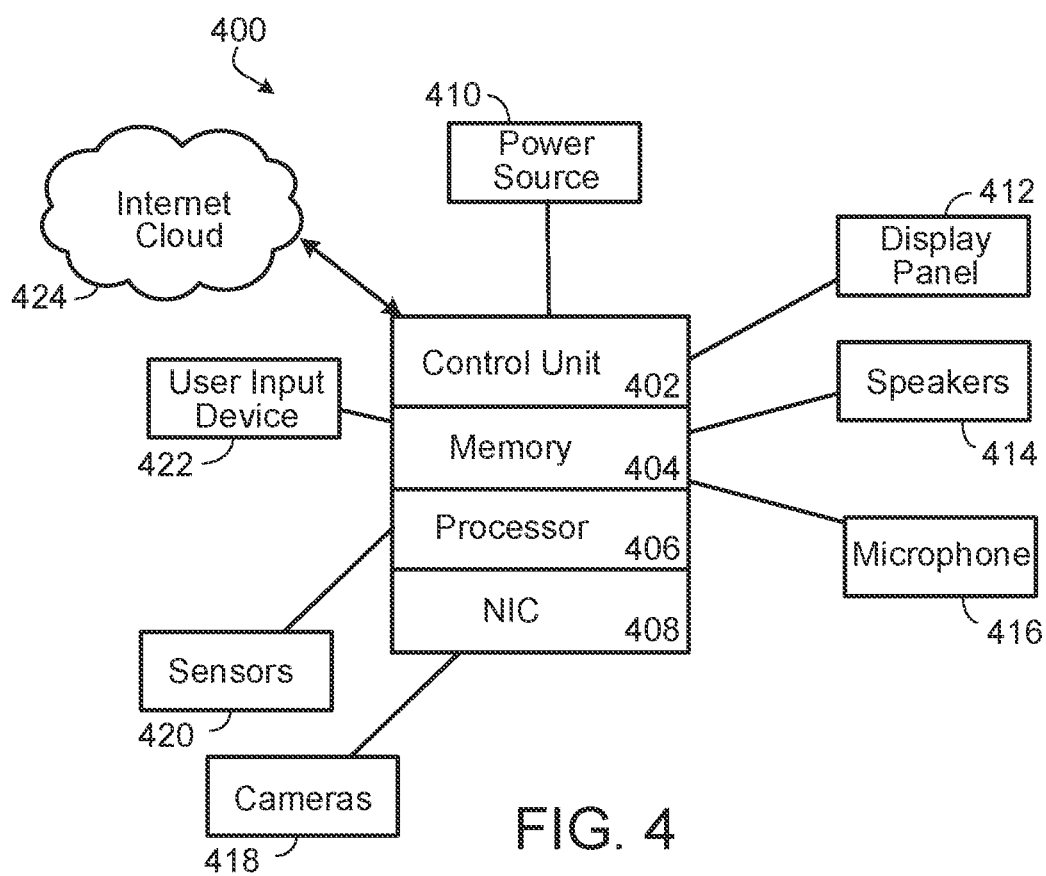
FIG. 4 is a block diagram that illustrates an example computing system of a backboard system.

FIG. 4 is a block diagram that illustrates an example computing system 400 of a backboard. The computing system 400 can be illustrative of a backboard 110, backboard 204, basketball system 302-1, and basketball system 302-N. As previously mentioned, the basketball system includes a control unit 402 that receives the data from the sensors 420 and the cameras 418 and the control unit 402 can process and/or analyze the data from both sensors 420 and cameras 418. The control unit 402 includes a memory 404, a processor 406, and a Network Interface Card (NIC) 408, and is connected to other components of the computing system 400 via wired or wireless communication links.

The control unit 402 can receive data from other inputs such as a user input device 422. In one example, the user input device 422 is a personal smartphone or personal computer of the user. The user input device 422 can be connected to the control unit 402 via a wired connection through the NIC 408, e.g., the user input device 422 connected to the basketball system with a USB connector, an HDMI connector or a wireless connection. In one example, the wireless connection may be a Bluetooth connection between the user input device 422 and a transceiver connected to the basketball system and the control unit. In another example, the wireless connection may be a Wi-Fi network or cellular data network that connects to the internet or cloud 424. In this example, the internet 424 can provide wireless access/connection between the control unit 402 and the user input device 422, e.g., a personal smart phone. In certain examples, software stored on the memory analyzes the input data and generates output data that is communicated to the player via the user input device 422 and/or the display panel 412. The control unit 402 can also transmit data to and/or receive data from a software module or mobile application of the user input device 422. For instance, the mobile application of the user input device 422 can display data from the control unit 402 and/or provide entry fields for the user to input data which is sent to the control unit 402 via wired or wireless connection.

The power source 410 can power the components within the basketball system, as previously described. The control unit 402 can provide audible messages and music to the speakers 414. The control unit 402 can receive audible message and sounds from the microphone 416.

As noted above, the control unit 402 analyzes the input data to generate output data. The processor 406 processes the input data and uses software programs or modules stored on the memory 404. Different modules can use the output data such that the user can use the basketball system in different ways. For example, the user can stream personalized training sessions, play head-to-head basketball competitions against other player in remote locations, e.g., other basketball courts or local basketball courts. The output data can also be stored on the memory 404, the user input device 422, and/or a cloud storage system 424 such that performance and other metrics can be tracked over time as the user interacts with the basketball system. Accordingly, the user can access output data sets to understand how their basketball skill development and performance trends, e.g., number of missed shots, analyze or depict shot arcs relative to the rim 112, and other characteristics. The control unit 402 can also display performance data of the user to the display panel 412.

Figure 5:
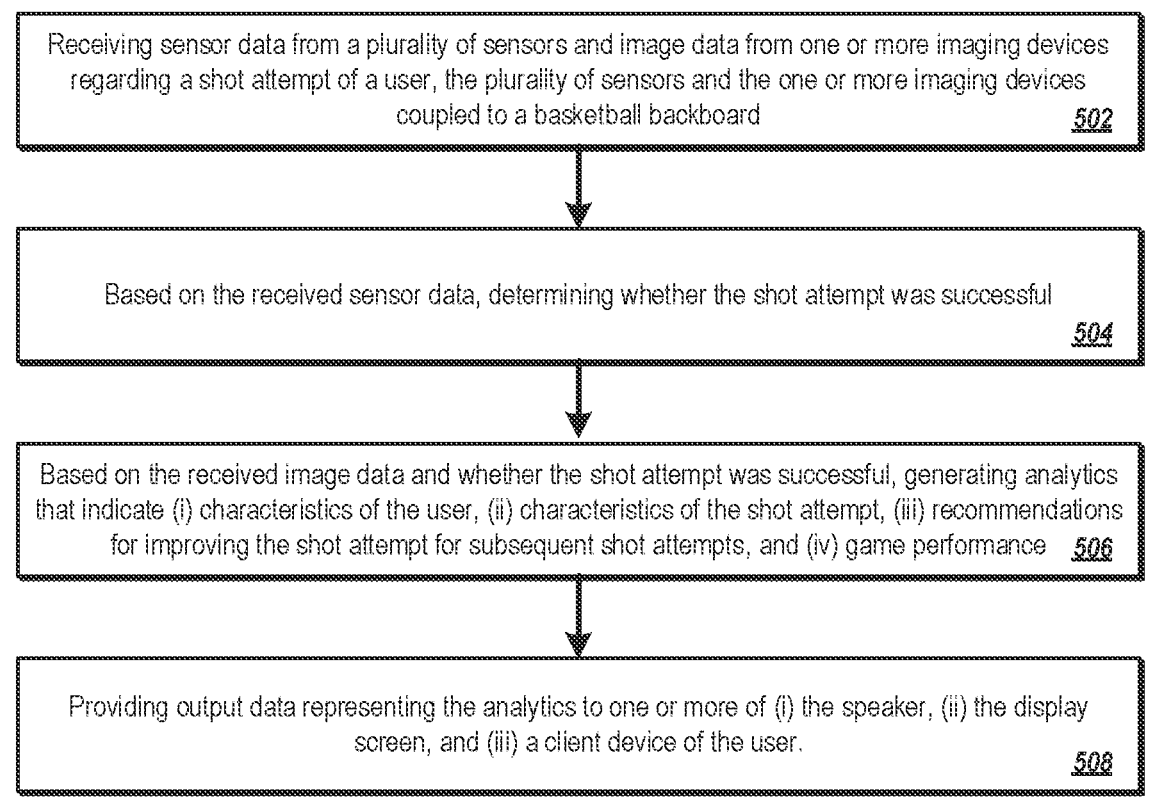
FIG. 5 is a flow diagram that illustrates an example of a process for generating characteristics of a user playing basketball.

FIG. 5 is a flow diagram that illustrates an example of a process 500 for generating characteristics of a user playing basketball. The process 500 can be performed by the backboard 110 of the basketball system 107 and backboard 204 of systems 200 and 201.

The backboard can receive sensor data from a plurality of sensors and image data from one or more imaging devices regarding a shot attempt of a user, the plurality of sensors and the one or more imaging devices coupled to the backboard (502). For example, a user can request to play a basketball game with the backboard. The user can authenticate with their client device and/or backboard using an authentication means, and can select a basketball game to play. For example, the basketball games can include a training session mode, local head-to-head matchups, live stream mode, and worldwide competition mode. Once the user has selected which basketball game to play via their client device or backboard, a control unit of the backboard can indicate to the user to start shooting a basketball towards a rim of the backboard. This may occur when a shot timer begins to count down or some other indication to start the selected basketball game.

As user plays the game, e.g., moves with a basketball or performs a shot attempt, the cameras and the sensors can generate image data and sensor data, respectively, and provide the image data and the sensor data to the control unit, where the control unit can determine (i) whether the user attempted a shot and (ii) whether the shot attempt was successful or unsuccessful. Each of the sensors and cameras can be configured to perform different and/or similar functions. For example, the LIDAR sensors can be configured to detect the shot attempt of the user and one or both of an angle and a height of the basketball from the shot attempt. The motion sensors can be configured to detect one or more users on a court within a proximity to the backboard. The trip sensors can be configured to determine the shot attempt was successful. The accelerometers can be configured to determine an indication of a location of the basketball relative to the backboard based on accelerometer data and a vibration pattern during a shot attempt.

Moreover, the backboard can include one or more cameras. The cameras can include one or more depth sensing cameras and/or one or more RGB cameras. Each of the cameras can be configured to perform different and/or similar functions. For example, the depth sensing cameras can be configured to perform one or more of the following: (i) detect the user on a court, (ii) track movements of the user, (iii) detect the basketball used by the user for the shot attempt, (iv) track movements of the basketball, (v) detect a body posture of a user. The one or more RGB cameras can be configured to perform one or more of the following: (i) record image data of a field of view of the court and (ii) record image data of an area underneath the backboard to detect when the shot attempt of the user corresponds to a layup.

The backboard can include multiple layers, each layer housing a different component. A front layer of the backboard can include a transparent coating for protection of the components within the backboard. For example, the front layer can include tempered glass that (i) protects the components within the backboard 110 and (ii) allows a user to see a display screen behind the front layer. The backboard can also include a second layer, seated behind the front layer. The second layer can include one or more components, e.g., sensors and cameras, for monitoring and generating data, e.g., sensor and image data, associated with user(s) on the court. The backboard can also include a third layer that houses a display screen. In some implementations, the second layer of the backboard can include the display screen for providing feedback to the one or more users playing basketball. The rim can be coupled to the protective layer of the backboard or the front layer of the backboard.

The backboard can also include a control unit, which houses the CPU and GPU for processing sensor and image data and providing output data to the display screen, one or more speakers, and/or a client device of the one or more users. The one or more speakers can provide audible output to the users corresponding to the output data.

The backboard can determine whether the shot attempt was successful based on the received sensor data (504). In some implementations, the user's shot attempt with the basketball may result in an unsuccessful attempt. In the unsuccessful attempt, the basketball may bounce off the rim, the backboard, or miss the backboard and components entirely. The backboard may further include one or more trip sensors that are configured to determine whether the basketball passes through the rim from the shot attempt.

In other implementations, the user's shot attempt with the basketball may result in a successful attempt. In the successful attempt, the basketball may pass through the rim from the shot attempt. The basketball may pass through the rim by bouncing off the backboard, may pass through the rim without bouncing off the backboard or the rim, or may pass through the rim by first bouncing off the rim and then passing through the rim.

The control unit of the backboard can indicate to the sensors to acquire sensor data on a periodic basis. In other examples, the control unit of the backboard can indicate to the sensor to acquire sensor data based on the type of basketball game being played. The control unit can also adjust a sensitivity of the sensors to improve detection of shot attempts, successful shot attempts, and unsuccessful shot attempts.

The backboard can generate analytics that indicate (i) characteristics of the user, (ii) characteristics of the shot attempt, (iii) recommendations for improving the shot attempt for subsequent shot attempts based on the received image data and whether the shot attempt was successful, and (iv) game performance (506). The cameras within the backboard can acquire image data from the depth sensing cameras and the RGB cameras. For example, the image data can include images or videos of the user(s) playing basketball on the court. The depth sensing cameras, for example, can generate (i) detection data of the user(s) on the basketball court, (ii) movement data of the user, (iii) detection data of the basketball used by the user, (iv) track movement data of the basketball, and (v) detection data of a body posture of the user. The depth sensing cameras can generate and track each of the different detection and movement data of the user and the basketball continuously and over a period of time.

The control unit can receive the image data from the depth sensing and RGB cameras and provide the image data to a trained machine-learning model. The machine-learning model can generate data that (i) classify or identify each user on the court as a unique and persistent user, (ii) identify a user's shot, (iii) generate characteristics of the user on the basketball court, and (iv) generate characteristics of the shot attempt by the user. The trained machine-learning model can identify and track each of the users on the court simultaneously. The characteristics of the user can include an identification of the user and a location of the user on the court relative to the backboard. The characteristics of the shot attempt can include an angle of the basketball trajectory during a shot attempt and an indication of whether the basketball passes through the rim. Moreover, the control unit can associate a user identified by the trained machine-learning model with a stored user profile.

Once identified, the control unit can update the stored user profile of the identified user with newly generated characteristics for that user including characteristics that describe the shot attempt of that user. More specifically, the control unit can determine resultant data based on the received sensor data that includes one or more of (i) whether the shot attempt resulted in the basketball passing through the rim, (ii) whether the shot attempt resulted in the basketball bouncing off a front side of the backboard and not passing through the rim, (iii) whether the shot attempt resulted in the basketball bouncing off the rim and not passing through the rim, (iv) location of the shot attempt of the user, (v) an arc of the basketball during the shot attempt by the user. The control unit can store the resultant data with the characteristics of the user, the characteristics of the shot attempt output from the trained machine learning model, the received sensor data, and the received image data in the corresponding profile. The control unit can then provide the updated profile to the external server, where a plurality of profiles are stored, each profile corresponding to a different user.

In some implementations, the control unit can use the image data to determine whether a shot attempt was successful or unsuccessful. For example, the control unit can apply a virtual inner cone and a virtual outer cone to the received image data from the depth sensing cameras. The virtual inner cone can include an inner radius that matches to a radius of the rim, can include a base that coincides with the rim, and can include a height that extends from the rim. The virtual outer cone can include an outer radius that extends a distance away from the rim, can include an extrusion the size of the virtual inner cone so the two cones do not overlap, and can include a height that extends from the rim, and is taller than the height for the virtual inner cone. Based on these cones, the control unit can determine whether a shot attempt resulted in a successful or unsuccessful shot. For example, if the basketball passes through each cone and exits the base of the virtual inner cone, then the control unit can determine that the shot attempt was successful. Alternatively, if the basketball does not pass through both of these cones or does not exit the base of the virtual inner cone, then the control unit can determine that the shot attempt was unsuccessful.

In some implementations, the control unit can use the data generated from trained machine-learning model and the received data to generate recommendations for the user. For example, the recommendations can include improvements for the user for subsequent shot attempts. The recommendations can focus one or more of (i) a body posture, (ii) an arm angle, (iii) a release point of the basketball, and (iv) a trajectory of the basketball, during subsequent shot attempts for the user. The recommendations can also be stored with the profile for the specific identified user.

In some implementations, the control unit can store game data or game performance associated with the game played by the user in a profile of the user. The type of games played can include, for example, training session modes, local head-to-head matchups, live stream mode, and worldwide competition mode. For example, the game performance can include that represents the game played, a date and time the game was played, a number of players in the game, an identification of each player playing the game, a final score of the game, makes and misses for each for each player during the game, locations on the basketball court of each of the makes and misses from each player, and a time at which each make and miss occurred for each player in both absolute time and in relative time (relative to the start of the game). The control unit can store the game data as a tuple, struct, class, or some other computer format. If multiple users are playing a single game, then the control unit can store game data for each of the users in their corresponding profile for that single game.

The backboard can provide output data representing the analytics to one or more of (i) the speaker, (ii) the display screen, and (iii) a client device of the user (508). For example, the control unit of the backboard can provide the output data that includes the generated recommendations to the display screen of the backboard. The output data can also correspond to an audible voice output, which can be provided to a speaker of the backboard to communicate the generated recommendations to the user. In another example, the control unit can provide the generated recommendations to the client device of the user over a network. The control unit can also provide media from the RGB cameras to the display screen of the backboard. In other examples, the control unit can receive media from another control unit associated with another backboard and display the received media from the other control unit on the backboard, such as during specific game types.

In some examples, the user can review their profile that includes the generated recommendations and the determined analytics. The user can review their corresponding profile on their client device and/or on the display screen of the backboard. The control unit can receive an indication from the user to access the corresponding profile and the control unit can identify the corresponding profile of the user on the user. The control unit can determine which user profile to access based on authentication and identification of the user. Then, the control unit can provide the corresponding profile and its contents to the client device of the user and/or to the display screen of the backboard. The user can review analytics on previous shot attempts, such as recorded footage, recommendations, comparisons between their shot attempt and professional athlete shot attempts, data associated with basketball games played by the user, e.g., a type of game played, shot attempts, makes/misses, and opponent shot attempts, makes/misses, time stamped information, and other basketball information associated with the user interacting with the basketball system.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, e.g., Xbox, Play Station, Wii, watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, monitoring, evaluating, comparing, and/or similar terms used herein interchangeably. In various embodiments, these functions, operations, and/or processes can be performed on data, content, information, and/or similar terms used herein interchangeably. Furthermore, in embodiments of the present invention, client device 104 may be a mobile device, and may be operated by a user participating in an interactive physical game.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A basketball backboard comprising:
   a housing configured to be coupled to a mounting structure comprising:
   one or more sensors configured to generate sensor data of a basketball shot attempt by a user;
   a speaker;
   a display;
   a protective layer coupled to the display, and a rim coupled to the protective layer;
   a control unit configured to:
   receive the sensor data from the one or more sensors;
   based on the received sensor data, determine whether the shot attempt was successful;
   provide output data representing one of the sensor data or the determination of whether the shot attempt was successful to one or more of (i) the speaker, (ii) the display, and (iii) a client device of the user.

2. The basketball backboard of claim 1, comprising a network interface coupled to the control unit, the network interface configured to connect the basketball backboard to one or more additional basketball backboards, transmit output data captured from the basketball backboard to the one or more additional basketball backboards, receive output data captured from the one or more additional basketball backboards, and provide the received output data to the control unit.

3. The basketball backboard of claim 1, wherein the mounting structure comprises a wall or a door.

4. The basketball backboard of claim 1, comprising a battery.

5. The basketball backboard of claim 1, wherein the sensor data is indicative of the shot attempt of the user or the location of the user relative to the backboard.

6. The basketball backboard of claim 1, comprising a rim coupled to the backboard.

7. The basketball backboard of claim 1, wherein the protective layer comprises tempered glass.

8. The basketball backboard of claim 1, wherein the speaker is configured to provide audible output in response to receiving the sensor data.

9. A basketball backboard comprising:
a housing comprising:
an imaging device configured to generate image data of a shot attempt of a user;
a display screen;
a protective layer coupled to the display screen, and a rim coupled to the protective layer;
a control unit, wherein the control unit is configured to:
receive the image data from the imaging device;
based on the received image data, determine whether the shot attempt was successful;
based on the received image data and whether the shot attempt was successful, generate analytics that indicate characteristics of the user and characteristics of the shot attempt;
provide output data representing the analytics for presentation on one or more of (i) a speaker, (ii) the display screen, and (iii) a client device of the user; and
a network interface coupled to the control unit, the network interface configured to connect the basketball backboard to one or more additional basketball backboards, transmit user image data captured from the basketball backboard to the one or more additional basketball backboards, receive user image data captured from the one or more additional basketball backboards, and provide the received user image data to the control unit.

10. The basketball backboard of claim 9, wherein the housing is configured to be coupled to a wall or door.

11. The basketball backboard of claim 9, wherein the imaging device is configured to perform one or more of the following (i) detect the user, (ii) track movements of the user, (iii) detect a basketball used by the user for the shot attempt, (iv) track movements of the basketball, (v) detect a body posture of a user, and (vi) record image data of a field of view of the imaging device.

12. The basketball backboard of claim 9, wherein the display screen is configured to display user image data of one or more users.

13. The basketball backboard of claim 9, wherein the control unit is configured to provide the received image data to a trained machine-learning model to produce (i) the characteristics of the user, (ii) the characteristics of the shot attempt, and (iii) game performance, wherein the characteristics of the user comprise an identification of the user and a location of the user relative to the backboard, wherein the characteristics of the shot attempt comprise an angle of basketball trajectory and an indication of whether the basketball passes through the rim, wherein the game performance comprises data associated with a game played by the user; and the control unit is configured to store the characteristics of the user, the characteristics of the shot attempt, and the game performance in a profile of the user in a server external to the backboard.

14. The basketball backboard of claim 13, wherein the trained machine-learning model is configured to identify and track multiple users simultaneously and the control unit is configured to: associate the multiple users identified by the trained machine-learning model each with a stored user profile; and update each of the stored user profiles with characteristics of each user and characteristics of a shot attempt of each user.

15. The basketball backboard of claim 13, wherein the server stores a plurality of profiles corresponding to different users.

16. The basketball backboard of claim 9, wherein the housing comprises a speaker, and the speaker is configured to provide audible output in response to receiving the output data representing the analytics from the control unit.

17. The basketball backboard of claim 9, wherein the housing comprises one or more anchor points for coupling the housing to the wall or the door.

18. A basketball backboard comprising:
a housing;
a display disposed in the housing, wherein the display is configured to display one or more of a video image, basketball shot characteristics of a user, characteristics of the user, or recommendations for the user regarding a basketball shot by the user; and
a protective layer coupled to the display, and a rim coupled to the protective layer.

* * * * *